(12) United States Patent  
Yasuda et al.

(10) Patent No.: US 11,151,804 B2  
(45) Date of Patent: Oct. 19, 2021

(54) INFORMATION PROCESSING DEVICE, INFORMATION PROCESSING METHOD, AND PROGRAM

(71) Applicant: SONY CORPORATION, Tokyo (JP)

(72) Inventors: Ryouhei Yasuda, Kanagawa (JP); Takuro Noda, Tokyo (JP); Seiji Wada, Kanagawa (JP); Takeshi Maeda, Tokyo (JP); Kana Matsuura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/325,504

(22) PCT Filed: Jun. 14, 2017

(86) PCT No.: PCT/JP2017/021920  
§ 371 (c)(1),  
(2) Date: Feb. 14, 2019

(87) PCT Pub. No.: WO2018/051592  
PCT Pub. Date: Mar. 22, 2018

(65) Prior Publication Data  
US 2019/0172271 A1    Jun. 6, 2019

(30) Foreign Application Priority Data  
Sep. 14, 2016   (JP) .............................. JP2016-179211

(51) Int. Cl.  
*G06T 19/20* (2011.01)  
*G06F 3/01* (2006.01)  
*G06F 3/0484* (2013.01)  
*G06F 3/0481* (2013.01)  
*G06F 3/0346* (2013.01)  
(Continued)

(52) U.S. Cl.  
CPC .............. *G06T 19/20* (2013.01); *G06F 3/011* (2013.01); *G06F 3/013* (2013.01); *G06F 3/014* (2013.01);  
(Continued)

(58) Field of Classification Search  
CPC ........... G06T 19/20; G06T 7/536; G06T 7/73; G06T 2219/2016; G06F 3/011;  
(Continued)

(56) References Cited

U.S. PATENT DOCUMENTS

2007/0206030 A1     9/2007 Lukis  
2014/0293022 A1*   10/2014 Okamoto ............. H04N 13/144  
                                                                    348/51  
2015/0161811 A1*    6/2015 Gehani ................... G06T 13/80  
                                                                    345/473

FOREIGN PATENT DOCUMENTS

JP          07175944 A   *   7/1995  
JP          H08-249500 A     9/1996  
(Continued)

OTHER PUBLICATIONS

Autodesk ("Rotate3D (Command)", 2014, https://knowledge.autodesk.com/support/autocad/learn-explore/caas/CloudHelp/cloudhelp/2015/ENU/AutoCAD-Core/files/GUID-BEA9136E-DE85-4EBD-BC8B-F2911B29A026-htm.html) (Year: 2014).*

(Continued)

*Primary Examiner* — Xin Sheng  
(74) *Attorney, Agent, or Firm* — Paratus Law Group, PLLC

(57) ABSTRACT

There is provided an information processing device for rotating an object relative to a viewpoint position of a user in further accordance with the user's desire, the information processing device including: a rotation center determination unit that determines a center of rotation based on a position (Continued)

of an object in a three-dimensional space and an instruction direction of a user in the three-dimensional space; and a rotation control unit that rotates the object relative to a viewpoint position of the user on the basis of the center of rotation.

21 Claims, 35 Drawing Sheets

(51) Int. Cl.
  *G06T 7/536* (2017.01)
  *G06T 7/73* (2017.01)
(52) U.S. Cl.
  CPC ........ *G06F 3/0346* (2013.01); *G06F 3/04815* (2013.01); *G06F 3/04845* (2013.01); *G06T 7/536* (2017.01); *G06T 7/73* (2017.01); *G06T 2219/2016* (2013.01)
(58) Field of Classification Search
  CPC ........ G06F 3/013; G06F 3/014; G06F 3/0346; G06F 3/04815; G06F 3/04845
  See application file for complete search history.

(56) References Cited

FOREIGN PATENT DOCUMENTS

| | | | | | |
|---|---|---|---|---|---|
| JP | 2000020754 | A | * | 1/2000 | |
| JP | 2010009392 | A | * | 1/2010 | |
| JP | 2011227759 | A | * | 11/2011 | |
| JP | 2013-105183 | A | | 5/2013 | |
| JP | 2014239384 | A | * | 12/2014 | .......... H04N 13/117 |
| JP | 2015-025345 | A | | 2/2015 | |
| JP | 2016-115965 | A | | 6/2016 | |
| WO | WO-2015025345 | A1 | * | 2/2015 | ......... G06F 3/04847 |

OTHER PUBLICATIONS

Pizlo, Zygmunt, et al. "New approach to the perception of 3D shape based on veridicality, complexity, symmetry and volume." Vision research 50.1 (2010): 1-11. (Year: 2010).*
Hashimoto et al., 3-D Modeler based on Intuitive Operations and Dynamic D.O.F. Controls in CAVE, TVRSJ, 1999, pp. 487-494, vol. 4, No. 3.

* cited by examiner

FIG. 1
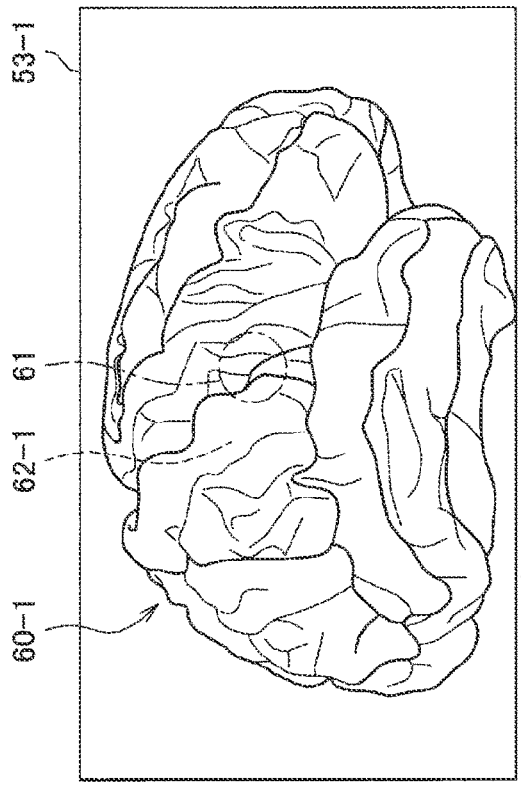
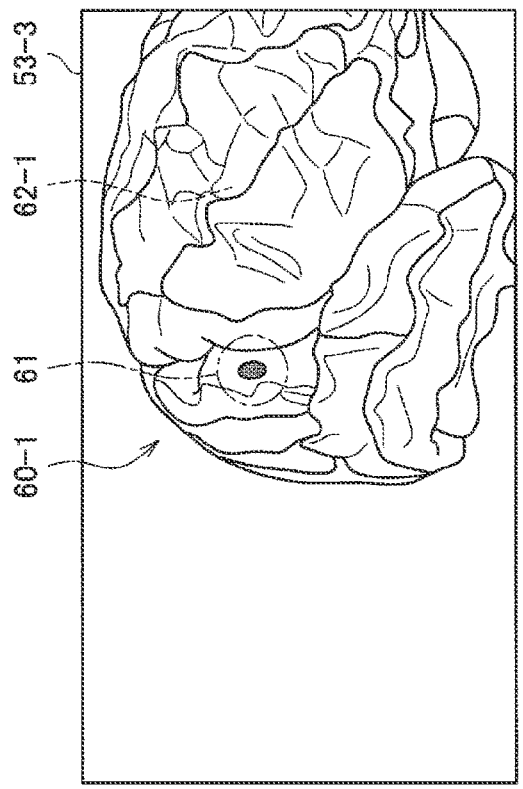
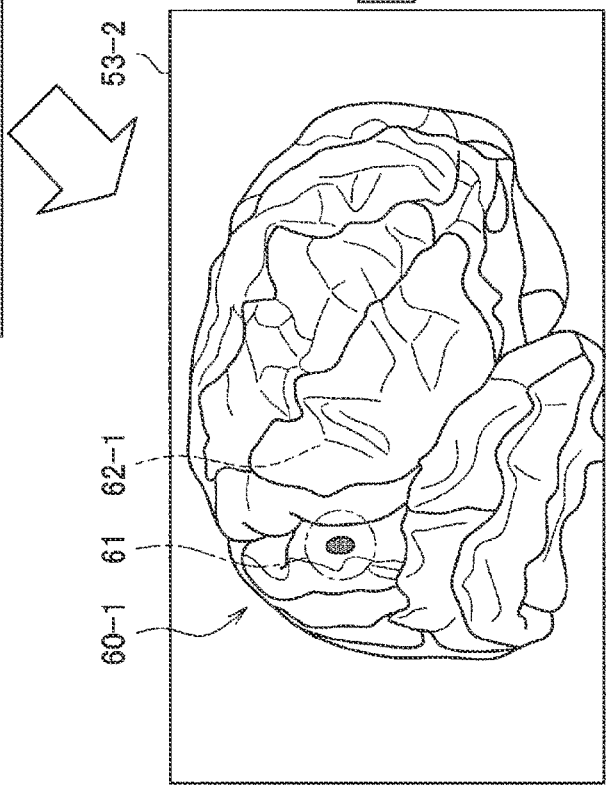

FIG. 10
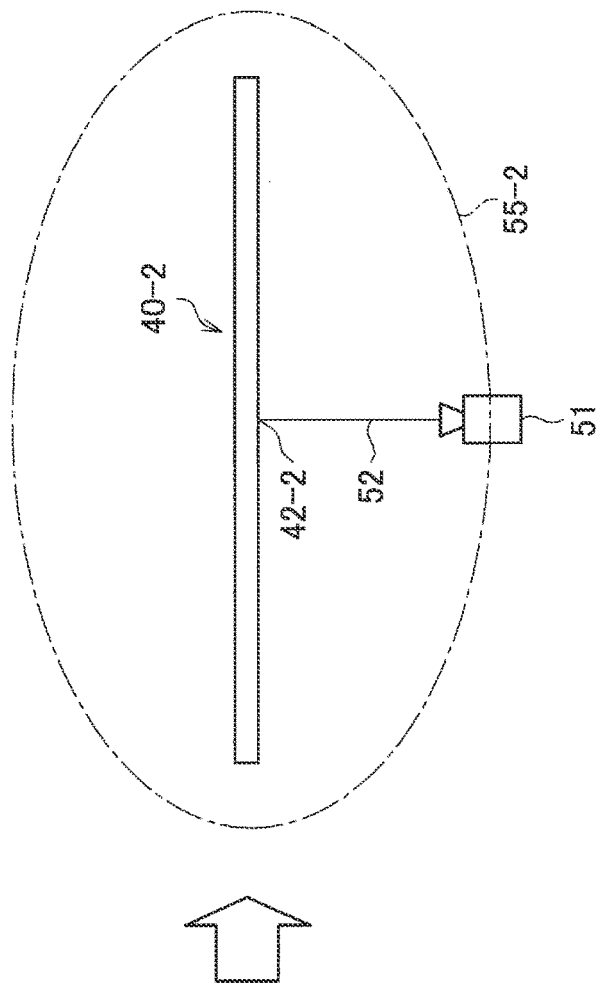
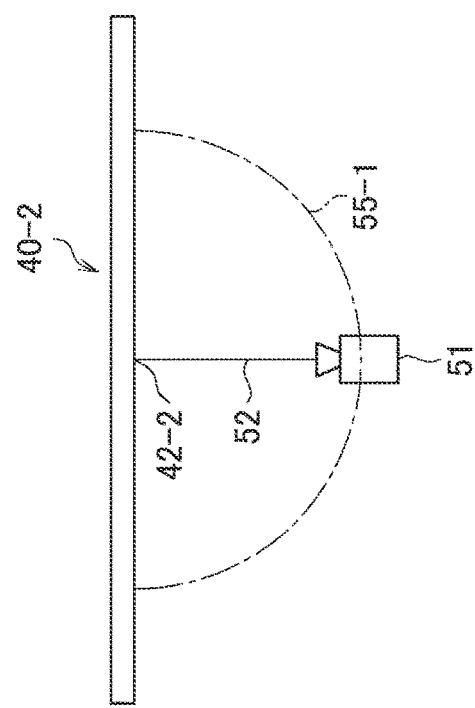

FIG. 11
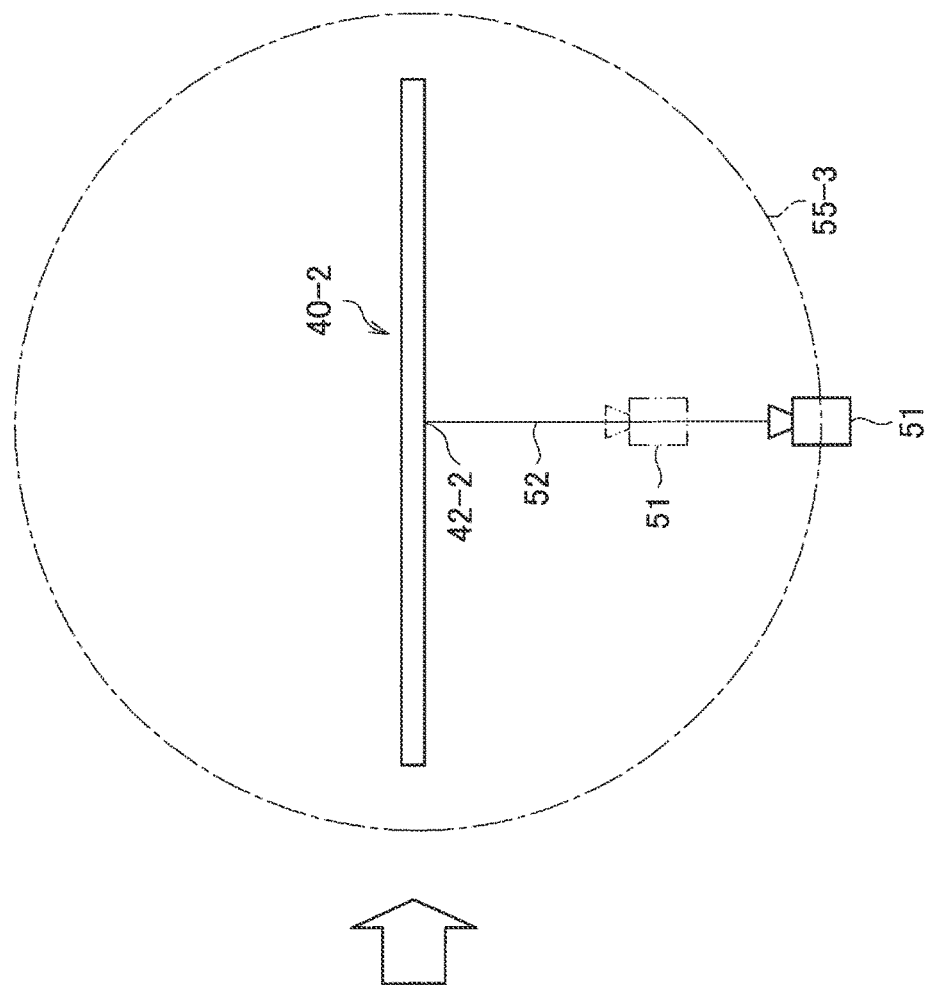
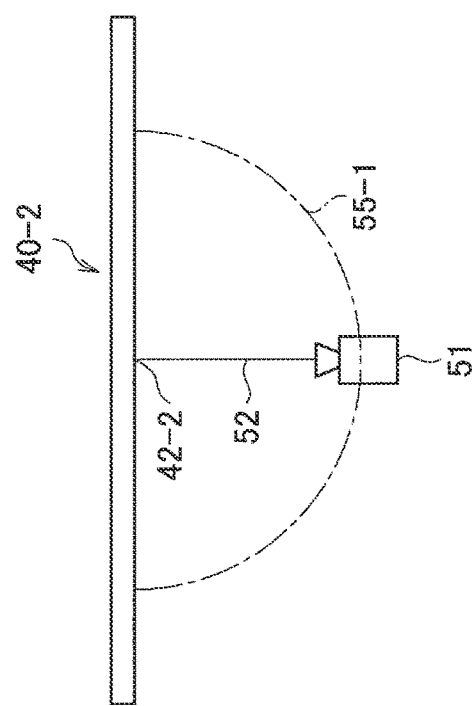

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2017/021920 (filed on Jun. 14, 2017) under 35 U.S.C. § 371, which claims priority to Japanese Patent Application No. 2016-179211 (filed on Sep. 14, 2016), which are all hereby incorporated by reference in their entirety.

TECHNICAL FIELD

The present disclosure relates to an information processing device, an information processing method, and a program.

BACKGROUND ART

In recent years, techniques for rotating an object in a three-dimensional space relative to a viewpoint position of a user have been known. Here, the viewpoint position of the user may be a position indicating the position from which the user is viewing the object (a three-dimensional position where the user's field of view is formed relative to the position of the object). The user can observe the object while changing the position of a viewpoint by the rotation of the object relative to the position of the viewpoint.

For example, as an example of an object, a technique for displaying an image captured by a camera while rotating the image on the basis of a user's rotating operation is disclosed (see, for example, Patent Literature 1). In such a technique, the center of rotation of an object is generally determined in advance. As an example, the center of rotation of an object may be determined in advance at the center of the object.

CITATION LIST

Patent Literature

Patent Literature 1: JP 2016-115965A

DISCLOSURE OF INVENTION

Technical Problem

However, it is desirable to provide a technique for rotating an object relative to a viewpoint position of a user in further accordance with the user's desire.

Solution to Problem

According to the present disclosure, there is provided an information processing device including: a rotation center determination unit that determines a center of rotation based on a position of an object in a three-dimensional space and an instruction direction of a user in the three-dimensional space; and a rotation control unit that rotates the object relative to a viewpoint position of the user on the basis of the center of rotation.

According to the present disclosure, there is provided an information processing method including: determining a center of rotation based on a position of an object in a three-dimensional space and an instruction direction of a user in the three-dimensional space; and rotating the object relative to a viewpoint position of the user by a processor on the basis of the center of rotation.

According to the present disclosure, there is provided a program causing a computer to function as an information processing device including a rotation center determination unit that determines a center of rotation based on a position of an object in a three-dimensional space and an instruction direction of a user in the three-dimensional space, and a rotation control unit that rotates the object relative to a viewpoint position of the user on the basis of the center of rotation.

Advantageous Effects of Invention

As described above, according to the present disclosure, a technique for rotating an object relative to a viewpoint position of a user in further accordance with the user's desire is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram illustrating an example of rotation of an object in a case in which the center of rotation of the object is determined in advance.

FIG. 10 is a diagram illustrating a first solution in a case in which a virtual object collides with a viewpoint camera.

FIG. 11 is a diagram illustrating a second solution in a case in which a virtual object collides with a viewpoint camera.

MODE(S) FOR CARRYING OUT THE INVENTION

Figure 2:
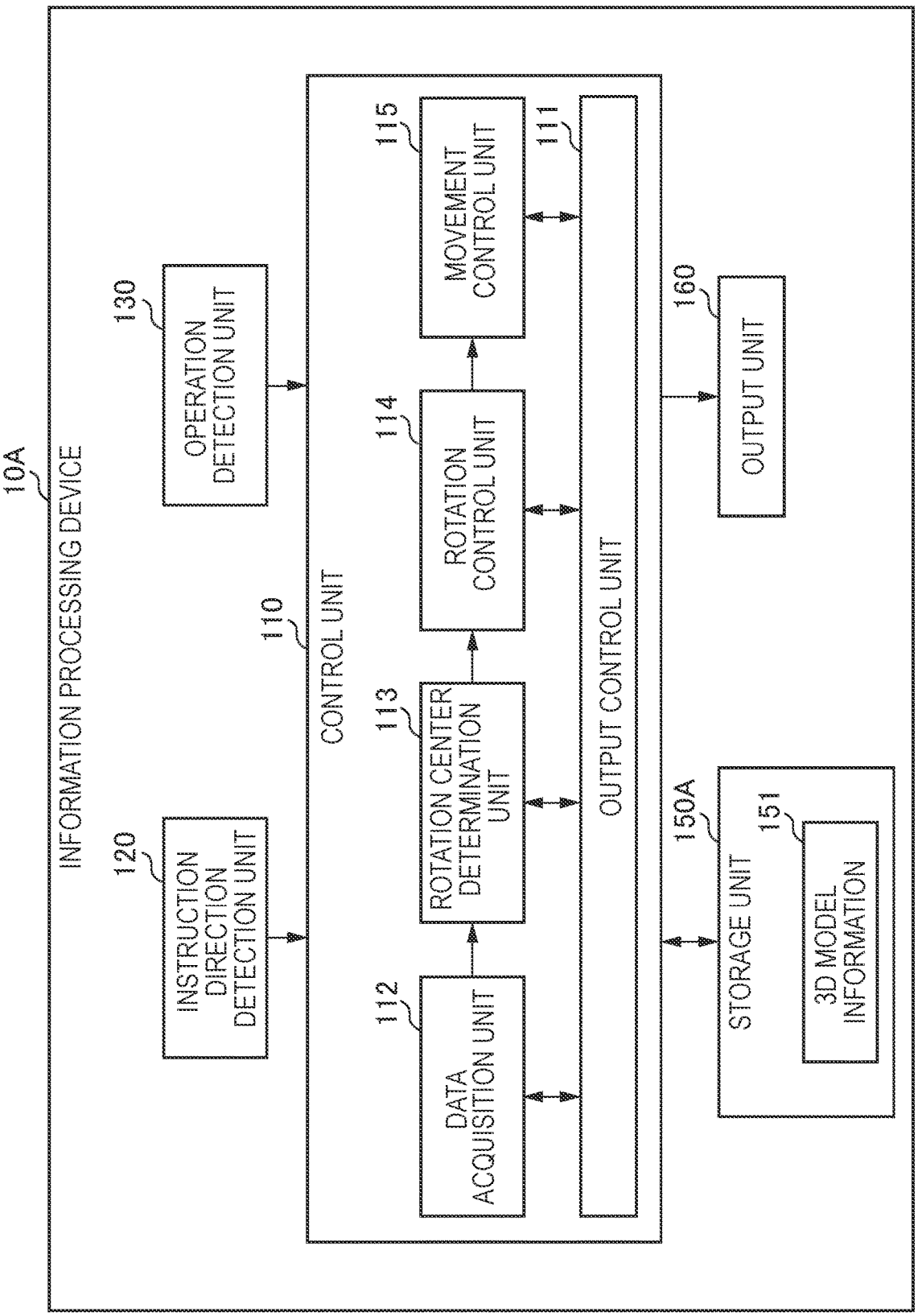
FIG. 2 is a diagram illustrating a functional configuration example of an information processing device according to a first embodiment of the present disclosure.

Hereinafter, (a) preferred embodiment (s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in the present specification and the drawings, structural elements that have substantially the same or similar function and structure are sometimes distinguished from each other using different numbers after the same reference sign. However, when there is no need in particular to distinguish structural elements that have substantially the same or similar function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

Note that a description will be given in the following order.

1. Description of first embodiment
1.1. Functional configuration example
1.2. Overall function
2. Description of second embodiment
2.1. Functional configuration example
2.2. Overall function
3. Hardware configuration example
4. Conclusion First, a premise configuration of an embodiment of the present disclosure will be described. In the embodiment of the present disclosure, an object in a three-dimensional space is rotated relative to a viewpoint position of a user. Here, the viewpoint position of the user may be a position indicating the position from which the user is viewing the object (a three-dimensional position where the user's field of view is formed relative to the position of the object). The user can observe the object while changing the position of a viewpoint by the rotation of the object relative to the position of the viewpoint.

For example, in the embodiment of the present disclosure, an image captured by a camera as an operation object is displayed while being rotated on the basis of a user's rotating operation. In a case in which an object is rotated on the basis of a user's rotating operation, the center of rotation of the object is normally determined at a predetermined position in advance. For example, the center of rotation of the object may be determined at the center of the object in advance.

An example of rotation of an object in a case in which the center of rotation of the object is determined in advance will be described with reference to FIG. 1. In FIG. 1, a case in which a virtual object is in a virtual space and is imaged by a viewpoint camera virtually present at a viewpoint position is assumed. Referring to FIG. 1, a field of view 53-1 is provided by the image captured in this manner. In the example illustrated in FIG. 1, a three-dimensional model of a brain (hereinafter, a "three-dimensional model" will also be referred to simply as a "3D model") is displayed as an example of a virtual object 60-1 provided to the field of view 53-1.

Note that, in the present specification, an example in which a user indirectly observes a virtual object or a real object through the display of an image captured by a viewpoint camera 51 which is realistically or virtually present at a viewpoint position will be mainly described. However, for example, a case in which a user is directly present at a viewpoint position is also assumed. In such a case, the user may directly observe the virtual object or the real object. In this case, the viewpoint camera 51 may not be particularly provided.

Here, a case in which a user having observed the field of view 53-1 desires to observe an observation-desired region 61 of the user in more detail in the virtual object 60-1 is assumed. In the example illustrated in FIG. 1, a case in which the observation-desired region 61 is a groove portion and the user desires to look into the left back side of the groove portion from the right front side is assumed. In such a case, the user can look into the left back side of the groove portion from the right front side by performing an operation of rotating the image relative to the virtual object 60-1 (clockwise when seen from above).

Here, in a case in which the center position of the virtual object 60-1 is determined in advance as a center of rotation 62-1, there is a likelihood that the observation-desired region 61 may not be provided as desired by the user when the virtual object 60-1 is rotated with the center of rotation 62-1 as a reference. Although the virtual object 60-1 after rotation is seen in a field of view 53-2, the observation-desired region 61 becomes more distant toward the inner side and is greatly separated from the vicinity of the center of the field of view 53-2.

In such a case, the user can position the observation-desired region 61 in the vicinity of the center of the field of view 53-2 by performing an operation of moving the virtual object 60-1. The virtual object 60-1 after movement is seen in a field of view 53-3. In addition, the user can enlarge the virtual object 60-1 by performing an operation of enlarging the virtual object 60-1. However, the operation of moving or enlarging the virtual object 60-1 may be troublesome for the user.

Consequently, in the present specification, a technique for rotating an object relative to a viewpoint position of a user in further accordance with the user's desire will be mainly described. Note that, in FIG. 1, the virtual object 60-1 in a virtual space is provided in the field of view 53-1 of the user as an example of an object. However, as will be described later, in the embodiment of the present disclosure, an object may be a real object in a real space.

The background of the embodiment of the present disclosure has been described above.

1. DESCRIPTION OF FIRST EMBODIMENT

Next, a first embodiment of the present disclosure will be described. In the first embodiment of the present disclosure, an example in which a virtual object in a virtual space is rotated will be mainly described.

[1.1. Functional Configuration Example]

First, a functional configuration example of an information processing device according to the first embodiment of the present disclosure will be described. FIG. 2 is a diagram illustrating a functional configuration example of an information processing device according to the first embodiment of the present disclosure. As illustrated in FIG. 2, an information processing device 10A includes a control unit 110, an instruction direction detection unit 120, an operation detection unit 130, a storage unit 150A, and an output unit 160.

Note that, in the present specification, an example in which the control unit 110, the instruction direction detection unit 120, the operation detection unit 130, the storage unit 150A, and the output unit 160 are within the same device (information processing device 10A) will be mainly described. However, the positions of these blocks are not particularly limited. For example, as will be described later, some of these blocks may be in a server or the like.

The control unit 110 executes the control of each unit of the information processing device 10A. As illustrated in FIG. 2, the control unit 110 includes an output control unit 111, a data acquisition unit 112, a rotation center determination unit 113, a rotation control unit 114, and a movement control unit 115. Details of these functional blocks will be described later. Note that the control unit 110 may be constituted by, for example, a central processing unit (CPU) or the like. In a case in which the control unit 110 is constituted by a processing device such as a CPU, such a processing device may be constituted by an electronic circuit.

The instruction direction detection unit 120 can detect a user's instruction direction (hereinafter, also simply referred to as an "instruction direction") in a three-dimensional space. In the present specification, a case in which a line of sight of a user is used as an instruction direction will be mainly described. Here, a line of sight of the user may be detected in any manner. As an example, a line of sight of the user may be detected on the basis of an eye region seen in an image captured by an imaging device in a case in which the instruction direction detection unit 120 includes the imaging device. However, the instruction direction is not limited to a line of sight of the user.

For example, the instruction direction may be detected on the basis of a detection result obtained by a motion sensor detecting a movement of the user (an instruction direction having a position in a three-dimensional space detected by the motion sensor as a destination may be detected). The motion sensor may detect acceleration through an acceleration sensor or may detect angular velocity through a gyro sensor (for example, a ring-type gyro mouse or the like). Alternatively, the instruction direction may be detected on the basis of a detection result obtained by a tactile type device. An example of the tactile type device is a pen-type tactile device.

Alternatively, the instruction direction may be a direction indicated by a predetermined object (for example, a direction indicated by a tip end of a bar, or the like), or may be a direction indicated by a user's finger. The direction indicated by the predetermined object and the direction indicated by the user's finger may be detected on the basis of an object and a finger which are seen in an image captured by an imaging device in a case in which the instruction direction detection unit 120 includes the imaging device. Alternatively, the instruction direction may be detected on the basis of a result of recognition of a user's face. For example, in a case in which the instruction direction detection unit 120 includes an imaging device, a center position between the eyes may be recognized on the basis of an image obtained by the imaging device, and a straight line extending from the center position between the eyes may be detected as an instruction direction.

Alternatively, the instruction direction may be detected on the basis of a recognition result of a marker. For example, in a case in which a two-dimensional marker is disposed in a three-dimensional space and the instruction direction detection unit 120 includes a visible light camera, an instruction direction may be detected on the basis of the position of the two-dimensional marker seen in an image obtained by imaging performed by the visible light camera. Further, in a case in which an infrared reflection marker is disposed in a three-dimensional space and the instruction direction detection unit 120 includes an infrared camera, an instruction direction may be detected on the basis of the position of the infrared reflection marker seen in an image obtained by imaging infrared reflected light in the infrared reflection marker by the infrared camera.

Alternatively, an instruction direction may be detected on the basis of a sound recognition result. For example, in the example illustrated in FIG. 1, in a case in which a user desires to designate the center of the virtual object 60-1 as a destination of an instruction direction, the user may utter an utterance (for example, an utterance such as "center of brain") referring to the center of the virtual object 60-1. In this manner, text data "center of brain" is obtained as a sound recognition result for such an utterance, and an instruction direction having the center of the virtual object 60-1 as a destination may be detected on the basis of the text data "center of brain."

Alternatively, in a case in which an instruction direction can be detected at the same time by a plurality of methods, any one of the plurality of methods may be selected as an object to be used. For example, a method having the highest accuracy of detection of an instruction direction (for example, a detection method based on a result of recognition of a marker, or the like) among the plurality of methods may be selected as an object to be used. In this case, the accuracy of detection may be determined in advance or may be calculated at different times. Alternatively, the most intuitive direction instruction method (for example, a line-of-sight detection method or the like) among the plurality of methods may be selected as an object to be used.

The operation detection unit 130 can detect an operation input by a user. Note that, in the present specification, object rotation and moving operations are mainly described as examples of operations input by a user. Here, the object rotation and moving operations may be detected in any manner. As an example, the object rotation and moving operations may be detected on the basis of the movement of a user. For example, in a case in which the movement of a user indicates rotation in a certain direction, a rotating operation in that direction may be detected. Further, in a case in which the movement of a user indicates movement in a certain direction, a moving operation in that direction may be detected.

The detection of movement of a user may be performed in any manner. For example, in a case in which the operation detection unit 130 includes an imaging device, the movement of a user may be detected from an image obtained by an imaging device. Alternatively, the operation detection unit 130 may detect the movement of a user through a motion sensor. The motion sensor may detect acceleration through an acceleration sensor, or may detect an angular velocity through a gyro sensor. Alternatively, the movement of a user may be detected on the basis of a sound recognition result.

Alternatively, the object rotation and moving operations may be operations performed on a switch, a lever, a button, and the like. In addition, the object rotation and moving operations may be detected on the basis of the position (for example, the position of the head, or the like) and posture (for example, the posture of the whole body, or the like) of a user's body, or the like. In addition, the object rotation and moving operations may be detected through myoelectricity (for example, myoelectricity of the jaw, myoelectricity of an arm, or the like), or may be detected through brain waves.

The storage unit 150A is a recording medium that stores a program executed by the control unit 110 or stores data necessary for the execution of the program. In addition, the storage unit 150A temporarily stores data in order to perform an arithmetic operation by the control unit 110. The storage unit 150A may be a magnetic storage unit device, a semiconductor storage device, an optical storage device, or a magneto-optical storage device. In particular, in the first embodiment of the present disclosure, the storage unit 150A stores information regarding a three-dimensional model (for example, information such as the shape, size, position, direction, and the like of the three-dimensional model) as 3D model information 151.

The output unit 160 outputs various pieces of information. For example, the output unit 160 may include a display capable of performing display capable of being visually recognized by a user, and the display may be a projector, a liquid crystal display, or an organic electro-luminescence (EL) display. In addition, the output unit 160 may include a sound output device. Alternatively, the output unit 160 may include a tactile presentation device that presents a tactile sensation to a user.

The functional configuration example of the information processing device 10A according to the first embodiment of the present disclosure has been described above.

[1.2. Overall Function]

Figure 3:
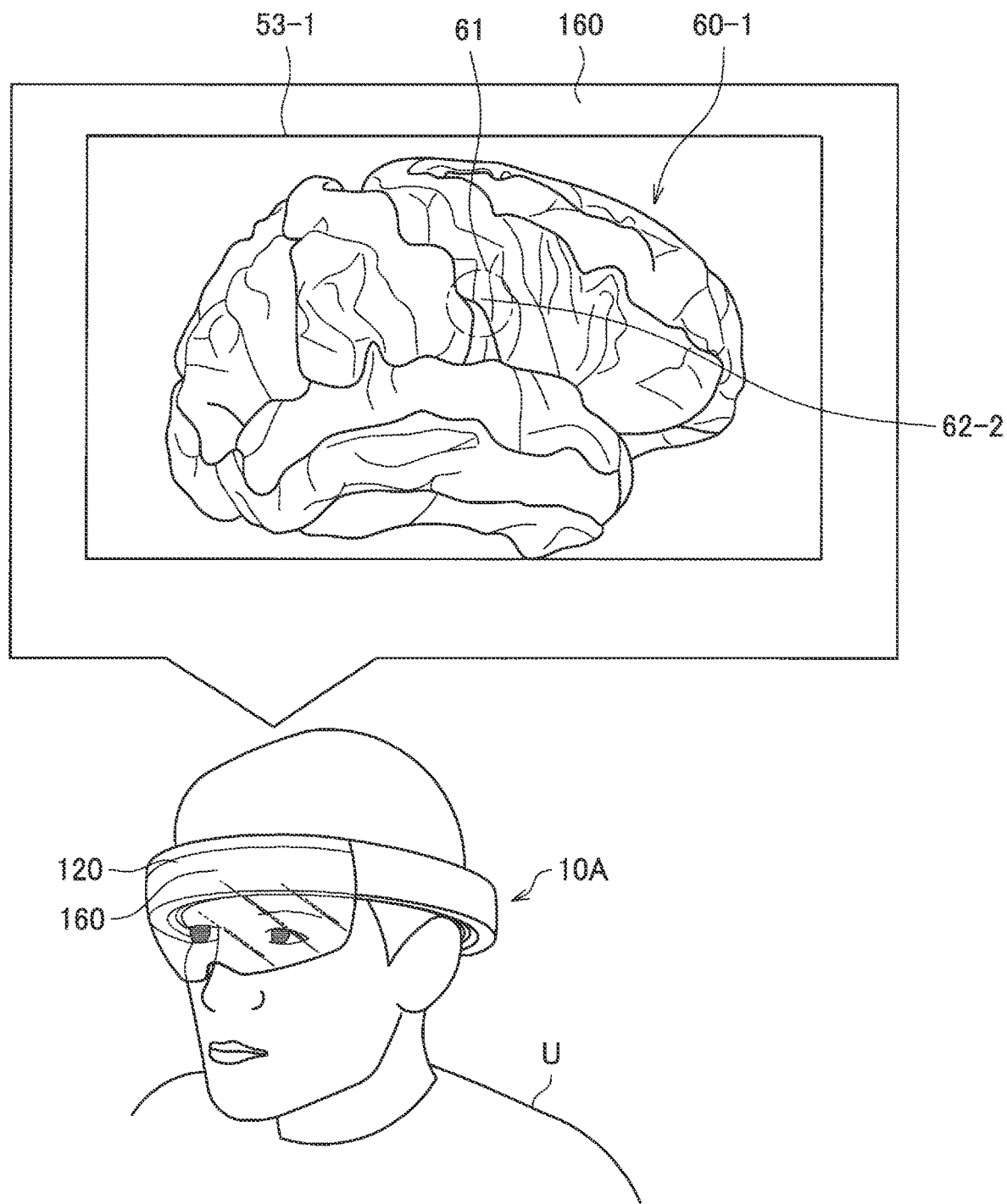
FIG. 3 is a diagram illustrating a first example of the information processing device according to the first embodiment of the present disclosure.
Figure 4:
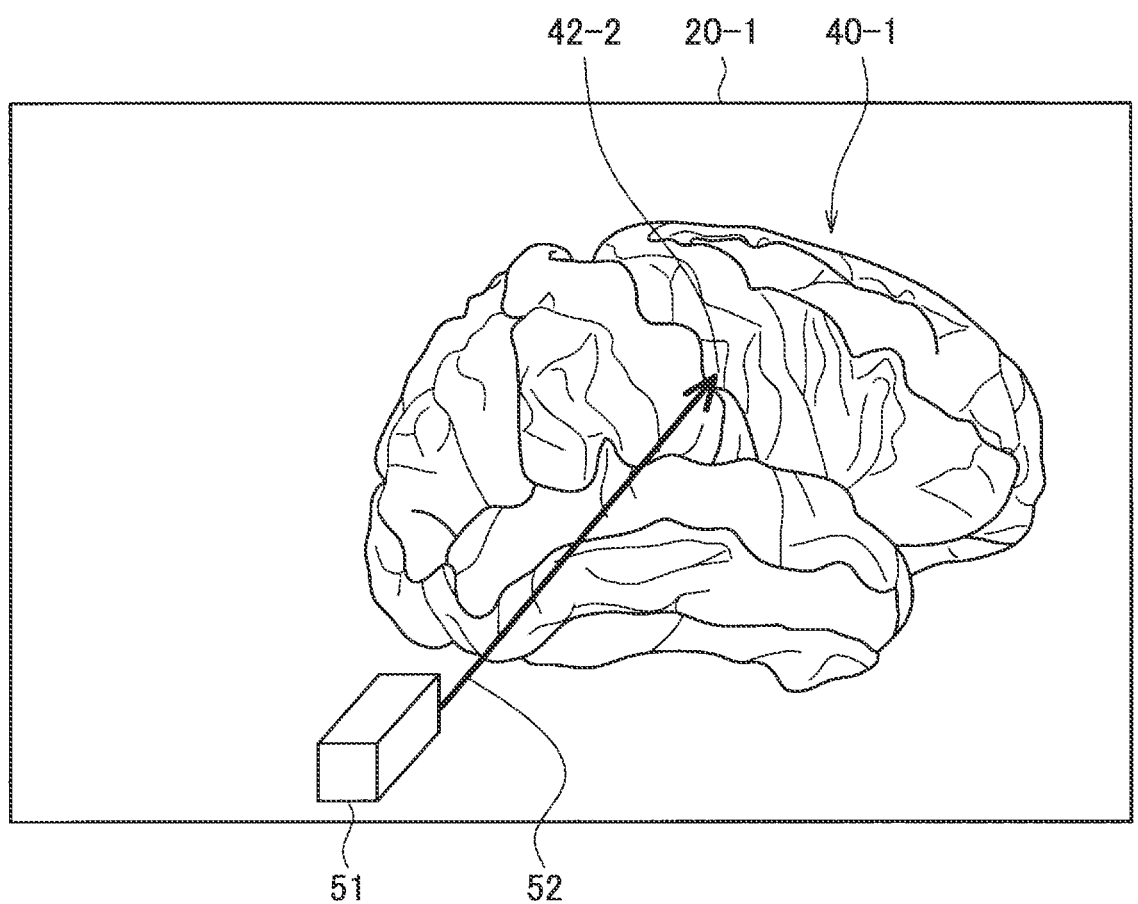
FIG. 4 is a diagram illustrating an example of a virtual object in a virtual space in the first example of the information processing device according to the first embodiment of the present disclosure.

Next, details of a function of the information processing device 10A according to the first embodiment of the present disclosure will be described. FIG. 3 is a diagram illustrating a first example of the information processing device 10A according to the first embodiment of the present disclosure. FIG. 4 is a diagram illustrating an example of a virtual object in a virtual space in the first example of the information processing device 10A according to the first embodiment of the present disclosure. As illustrated in FIG. 3, the information processing device 10A is worn on the head of a user U, and includes the instruction direction detection unit 120 and the output unit 160.

As illustrated in FIG. 3, in the first example, a case in which the information processing device 10A is a head mounted display (HMD) for augmented reality (AR) is mainly assumed. However, the information processing device 10A is not limited to the HMD for AR. For example, the information processing device 10A may be an HMD for virtual reality (VR), a television device, a personal computer (PC), a smart phone, or any other electronic apparatus.

Referring to FIG. 4, a virtual object 40-1 is present in a virtual space 20-1, and the viewpoint camera 51 is virtually present at a viewpoint position. In addition, an image obtained by imaging the virtual object 40-1 by the viewpoint camera 51 is displayed by the output unit 160 under the control of the output control unit 111, so that the field of view 53-1 is provided to the user U. In the example illustrated in FIG. 3, a 3D model of a brain is shown as an example of the virtual object 60-1 seen in the field of view 53-1.

Here, a case in which the user U having observed the field of view 53-1 desires to observe the observation-desired region 61 of the user U in more detail is assumed. In the example illustrated in FIG. 3, a case in which the observation-desired region 61 is a groove portion, and the user U desires to look into the left back side of the groove portion from the right front side is assumed. In such a case, the user U can look into the left back side of the groove portion from the right front side by performing an operation of rotating the image relative to the virtual object 60-1 (clockwise when seen from above).

A premise configuration in which the center position of the virtual object 60-1 is determined in advance as the center of rotation 62-1 has been described above with reference to FIG. 1. On the other hand, in the first embodiment of the present disclosure, the instruction direction detection unit 120 detects a gaze of the user U in a real space, and detects a line of sight 52 of the user U in the virtual space 20-1 which corresponds to the line of sight of the user U in the real space as an example of an instruction direction of the user U. In addition, the data acquisition unit 112 acquires the line of sight 52 of the user U in the virtual space 20-1 and acquires the position of the virtual object 40-1 in the virtual space 20-1 from the 3D model information 151.

In this case, the rotation center determination unit 113 determines the center of rotation on the basis of the position of the virtual object 40-1 in the virtual space 20-1 and the line of sight of the user U in the virtual space 20-1. FIG. 4 illustrates the line of sight 52 of the user U in the virtual space 20-1, and illustrates an example in which the rotation center determination unit 113 determines an intersection between the line of sight 52 of the user U in the virtual space 20-1 and the surface of the virtual object 40-1 as a center of rotation 42-2. In the field of view 53-1, a center of rotation 62-2 is seen as a point corresponding to the center of rotation 42-2 in the virtual space 20-1.

The rotation control unit 114 rotates the virtual object 40-1 relative to a viewpoint position (the position of the viewpoint camera 51) of the user U on the basis of the center of rotation 42-2. According to such a configuration, it is possible to rotate the virtual object 40-1 relative to the viewpoint position of the user U in further accordance with the user's U desire. Note that, in the present specification, it is mainly assumed that the rotation of the virtual object 40-1 is performed on the basis of a rotating operation of the user U. However, the rotation of the virtual object 40-1 may be automatically performed without depending on a rotating operation of the user U.

In addition, a term "rotation" used in the present specification means that a portion of an object (a virtual object or a real object) is moved while maintaining a constant distance from the center of rotation. Therefore, a portion of the object (the virtual object or the real object) may be present or may not be present at the center of rotation. That is, the "rotation" used in the present specification is a concept that may include various motion modes such as "autorotation" which is a motion with a specific axis not accompanied by a change in a substantial position in a three-dimensional space as a reference and "revolution" which is a motion on a specific circular track. Further, in the present specification, a rotation angle of an object is not limited. For example, the rotation angle of the object may be less than 360 degrees.

Further, in the first embodiment of the present disclosure, the virtual object 40-1 may be rotated relatively to a viewpoint position of the user U. Therefore, the rotation control unit 114 may directly rotate the virtual object 40-1 with the center of rotation 42-2 as a reference, or may directly rotate a viewpoint position (the position of the viewpoint camera 51). Hereinafter, an example will be mainly described in which the rotation control unit 114 directly rotates a viewpoint position (the position of the viewpoint camera 51) with the center of rotation 42-2 as a reference.

Figure 5:
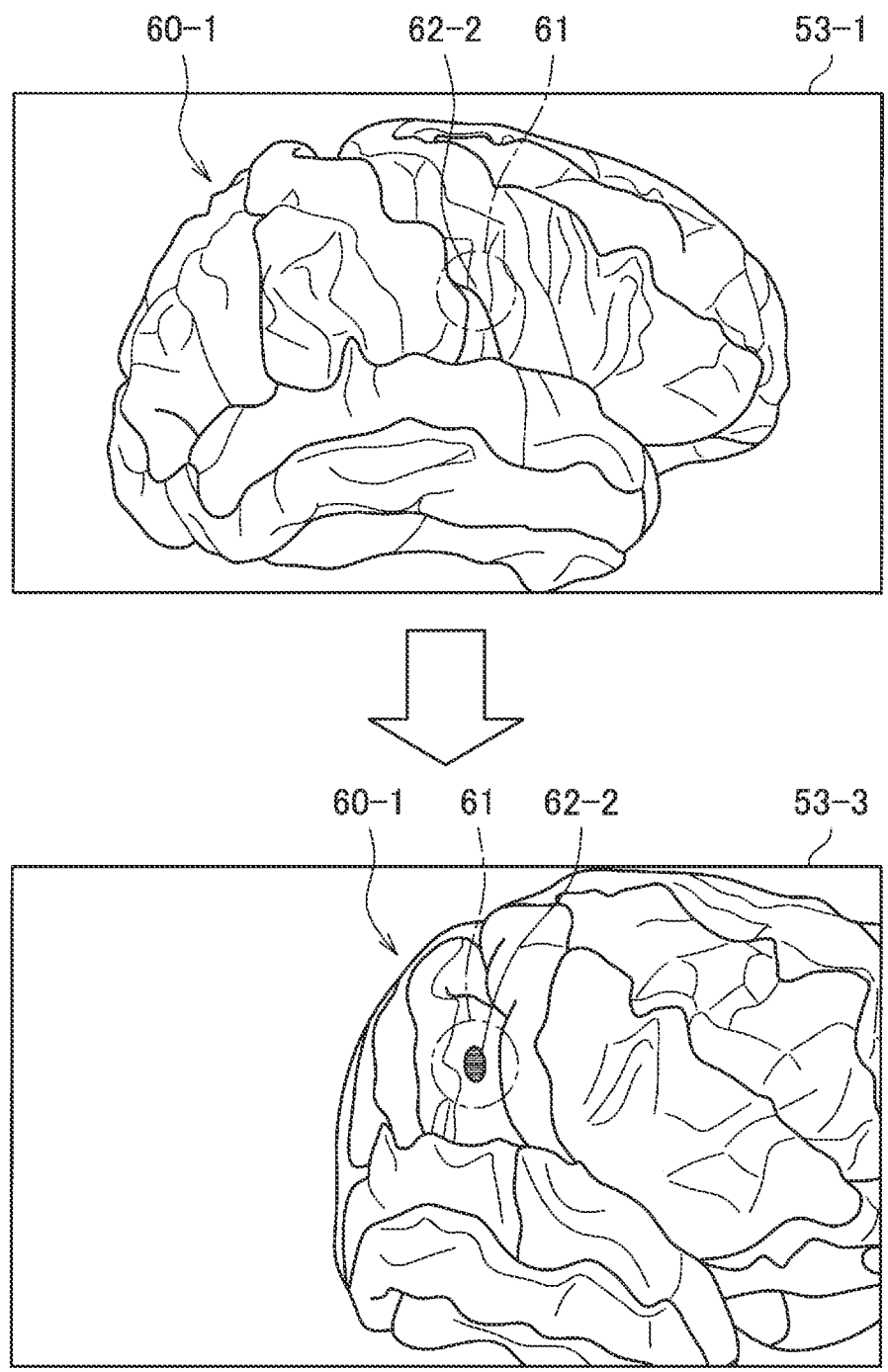
FIG. 5 is a diagram illustrating an example of a virtual object which is seen in a user's field of view in the first example of the first embodiment of the present disclosure.
Figure 6:
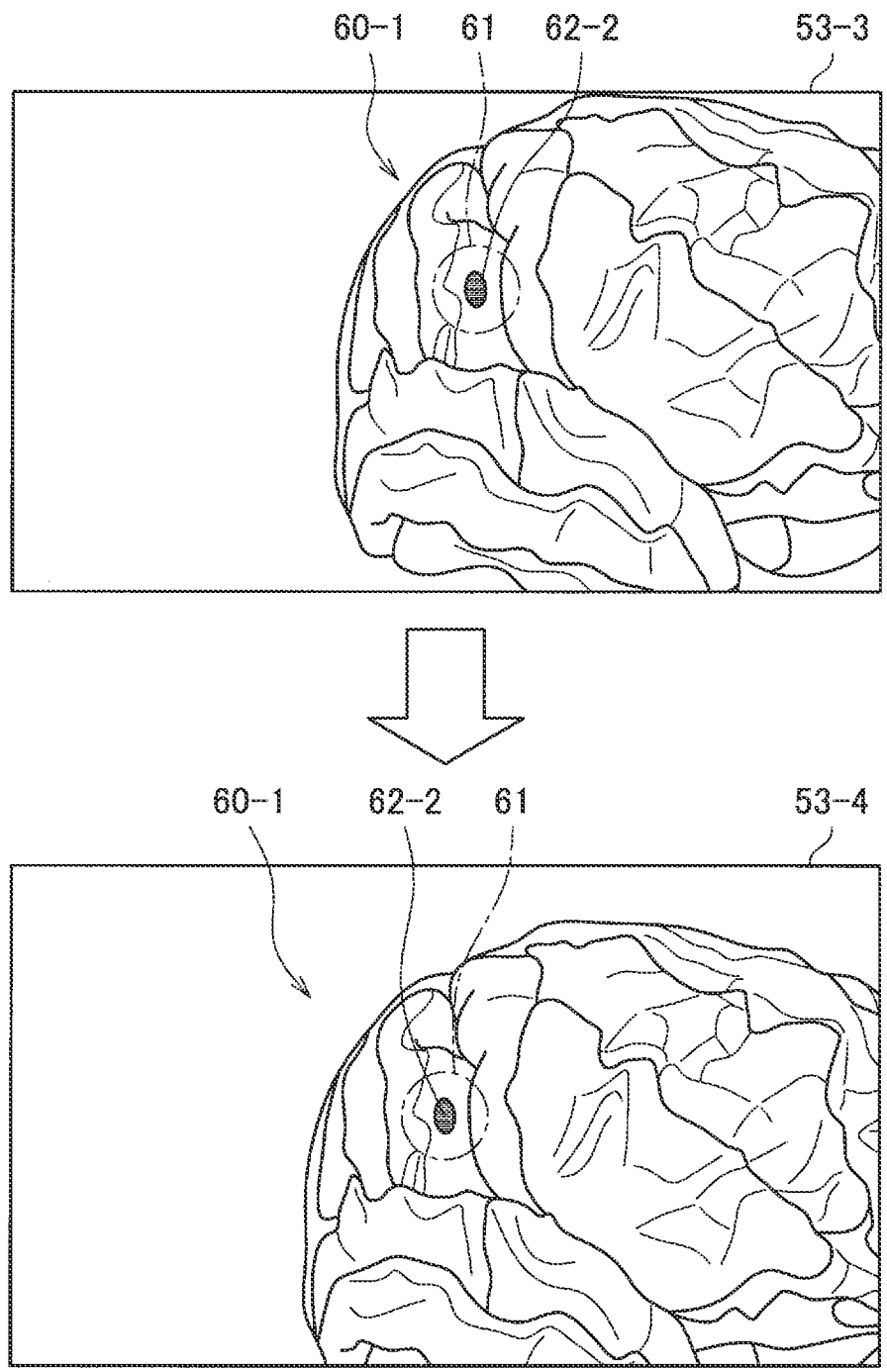
FIG. 6 is a diagram illustrating an example of a virtual object which is seen in a user's field of view in the first example of the first embodiment of the present disclosure.

FIGS. 5 and 6 are diagrams illustrating an example of the virtual object 60-1 seen in a field of view of the user U in the first example of the first embodiment of the present disclosure. As illustrated in FIG. 5, the virtual object 60-1 before rotation is seen in the field of view 53-1. In addition, the virtual object 60-1 after rotation is seen is seen in the field of view 53-3. In this case, the virtual object 40-1 in the virtual space 20-1 is rotated with an intersection between the line of sight 52 of the user U and the surface of the virtual object 40-1 as the center of rotation 42-2, and thus the observation-desired region 61 is moved without going far away and being separated from the center of the field of view 53-3.

The user U may stop a rotating operation with respect to the virtual object 40-1 in the virtual space 20-1 in a case in which the direction of the virtual object 60-1 provided to the field of view 53-3 is consistent with a desired direction. Then, the rotation of the virtual object 40-1 is stopped by the rotation control unit 114. In this case, the center of rotation 42-2 may be or may not be changed until the rotating operation is stopped. The change of the center of rotation 42-2 is realized by the change of the line of sight 52 of the user U.

The movement control unit 115 may cause the virtual object 60-1 to be moved in parallel relatively to the field of view 53-3 so that the center of rotation 62-2 aligns with a predetermined position of the field of view 53-3 of the user U in a case in which the center of rotation 42-2 is determined (may cause the virtual object 40-1 to be moved in parallel relatively to the viewpoint camera 51). Then, it is possible to provide the virtual object 60-1 which is more easily observed by the user U. Here, the predetermined position is not particularly limited.

For example, the predetermined position aligned with the center of rotation 62-2 may be the center of the field of view 53-3. Referring to a field of view 53-4, the virtual object 60-1 is moved relatively to the field of view 53-3 so that the center of rotation 62-2 aligns with the center of the field of view 53-3. Alternatively, the predetermined position aligned with the center of rotation 62-2 may be on the inner side of the field of view 53-3. That is, in a case in which the center of rotation 62-2 is present on the outer side of the field of view 53-3, the movement control unit 115 may move the virtual object 60-1 in parallel relatively to the field of view 53-3 so that the center of rotation 62-2 is present on the inner side of the field of view 53-3.

The parallel movement of the virtual object 60-1 relative to the field of view 53-3 may be realized by various methods. For example, the movement control unit 115 may relatively move the viewpoint camera 51 in parallel in the virtual space 20-1.

Alternatively, the movement control unit 115 may change a window position at which the field of view 53-4 is cut off by a digital zooming function of the viewpoint camera 51. Alternatively, in a case in which the viewpoint camera 51 is a whole-sky camera, the movement control unit 115 may select an image for forming the field of view 53-4 from a captured video.

Figure 7:
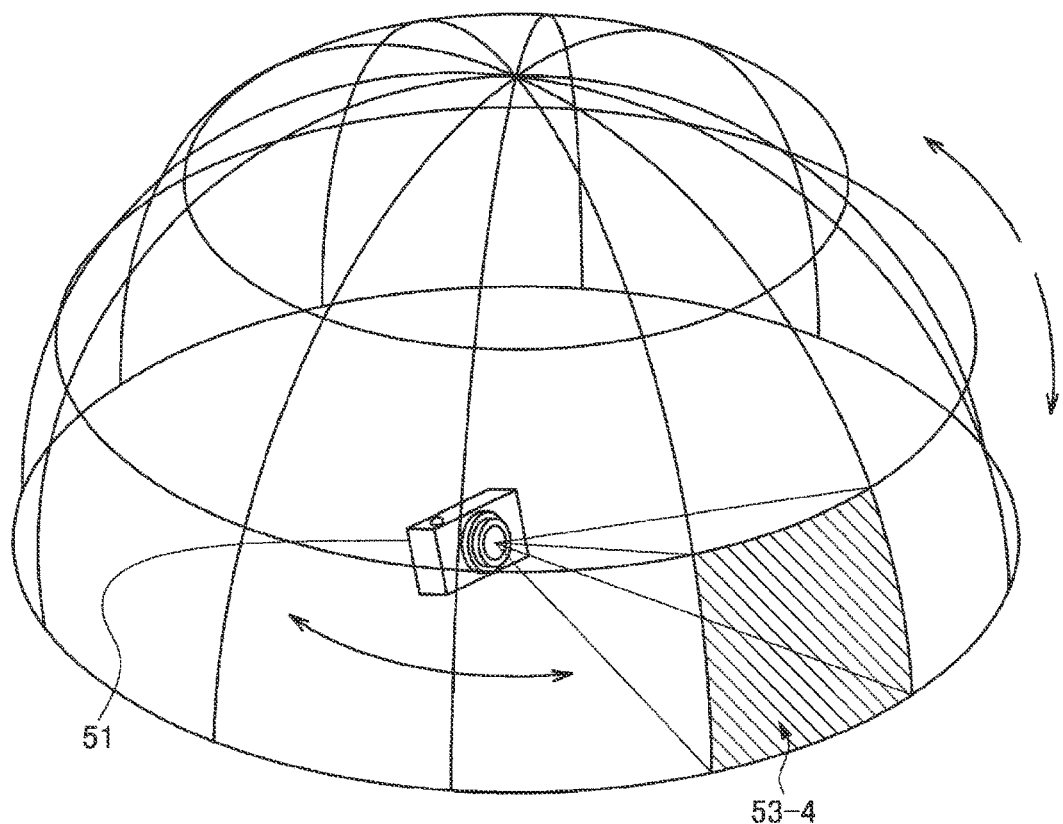
FIG. 7 is a diagram illustrating formation of a field of view in a case in which a viewpoint camera is a whole-sky camera.

FIG. 7 is a diagram illustrating the formation of the field of view 53-4 in a case in which the viewpoint camera 51 is a whole-sky camera. As illustrated in FIG. 7, in a case in which the viewpoint camera 51 is a whole-sky camera, for example, the viewpoint camera 51 can obtain a whole-sky video by performing imaging at 360 degrees in the horizontal direction and 180 degrees in the vertical direction.

Consequently, the movement control unit 115 can obtain an image for forming the field of view 53-4 from the whole-sky video by specifying an imaging direction of the viewpoint camera 51.

A description will continue by referring back to FIG. 6. A timing for the parallel movement of the virtual object 60-1 relative to the field of view 53-3 is not limited. For example, the movement control unit 115 may rotate the virtual object 60-1 and move the virtual object 60-1 in parallel relatively to the field of view 53-3. Alternatively, the movement control unit 115 may move the virtual object 60-1 in parallel relatively to the field of view 53-3 before or after the rotation of the virtual object 60-1.

In addition, the movement control unit 115 may move the virtual object 60-1 in parallel relatively to the field of view 53-3 without condition, but may move the virtual object 60-1 in parallel relatively to the field of view 53-3 with a condition. For example, the movement control unit 115 may move the virtual object 60-1 in parallel relatively to the field of view 53-3 in a case in which setting is performed in advance. Alternatively, the movement control unit 115 may move the virtual object 60-1 in parallel relatively to the field of view 53-3 in a case in which the type of the virtual object 60-1 is a predetermined type.

In the above, an example in which an intersection between a line of sight of a user and the surface of an object (as an example of a predetermined surface based on the position of the object) is determined as the center of rotation has been described. However, when the intersection between a line of sight of the user and the surface of the object is set to be the center of rotation in a case in which the shape of the object is complex or the like, the object may not be rotated in a manner that the user desires. As an example, even when the user observes the front side of a groove in the surface of the object, an intersection between a line of sight of the user and the surface of the object is on the back side of the groove. Accordingly, the back side of the groove is set to be the center of rotation, and thus the object may not be rotated in a manner that the user desires.

Consequently, hereinafter, a description will be given of a technique for rotating an object in a manner that the user desires more. As an example of an object, a case in which a virtual object is rotated will be described. Specifically, as an example of a predetermined surface based on the position of a virtual object, a surface covering the entirety or a portion of the virtual object (hereinafter, also referred to as an "envelope surface") is assumed. In addition, the rotation center determination unit 113 determines an intersection between the envelope surface of the virtual object in a virtual space and a line of sight in the virtual space as the center of rotation.

Figure 8:
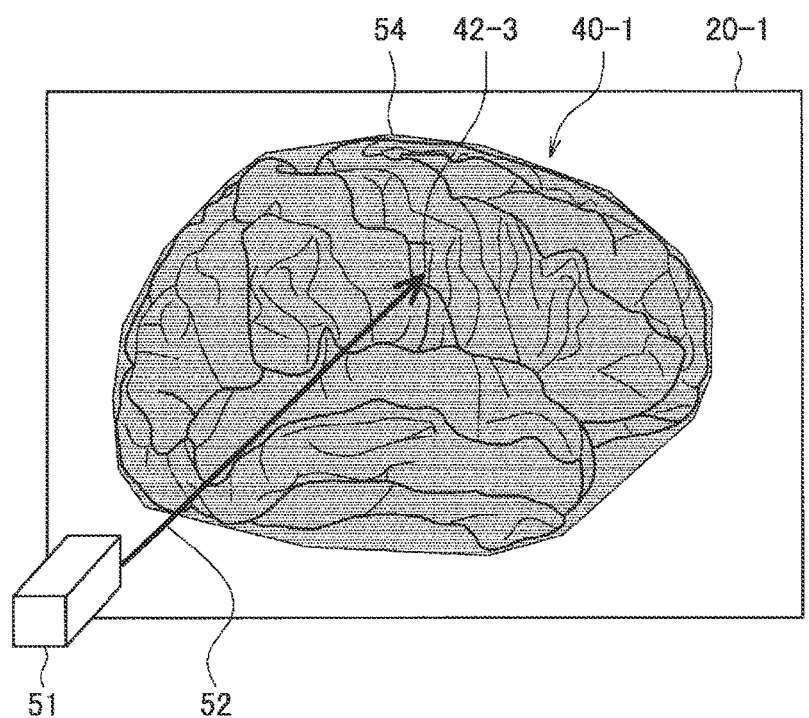
FIG. 8 is a diagram illustrating an example in which the center of rotation is determined using an envelope surface.

FIG. 8 is a diagram illustrating an example in which the center of rotation is determined using an envelope surface. As illustrated in FIG. 8, a case in which the virtual object 40-1 is present in the virtual space 20-1 is assumed. In addition, the rotation center determination unit 113 calculates an envelope surface 54 covering the entire virtual object 40-1. In this case, the rotation center determination unit 113 may determine an intersection between the line of sight 52 of the user U in the virtual space 20-1 and the envelope surface 54 as a center of rotation 42-3. Thereby, the front side of a groove actually observed by a user is set to be the center of rotation, which leads to an increasing likelihood that the virtual object 40-1 may be rotated in a manner that the user desires more.

Note that, here, an example in which the rotation center determination unit 113 calculates a smooth envelope surface is assumed as an example of a predetermined surface based on the position of the virtual object 40-1. However, the predetermined surface based on the position of the virtual object 40-1 may be a surface on which irregularities of the surface of the virtual object 40-1 are reflected to a certain degree instead of being a smooth surface.

For example, the rotation center determination unit 113 may calculate a voxel surface obtained by abstracting the surface of the virtual object 40-1 in voxel units (in regular lattice units in a three-dimensional space) as an example of the predetermined surface based on the position of the virtual object 40-1. Thereby, since the voxel surface is expressed more simply than the envelope surface, a load on calculation of the predetermined surface based on the position of the virtual object 40-1 and calculation of an intersection between the predetermined surface and a line of sight of the user is reduced.

In the above, the surface of the virtual object 40-1, the envelope surface, and the voxel surface have been described as an example of the predetermined surface based on the position of the virtual object 40-1. Here, it is not limited which one of these surfaces is used as an example of the predetermined surface based on the position of the virtual object 40-1. For example, the rotation center determination unit 113 may select a predetermined surface based on the position of the virtual object 40-1 in accordance with a selection operation of the user U.

Alternatively, the rotation center determination unit 113 may select a predetermined surface based on the position of the virtual object 40-1 in accordance with complexity of the shape of the virtual object 40-1. For example, the rotation center determination unit 113 may select an envelope surface or a voxel surface in a case in which complexity of the shape of the virtual object 40-1 exceeds a threshold value and may select the surface of the virtual object 40-1 in a case in which complexity of the shape of the virtual object 40-1 is equal to or less than the threshold value.

Note that complexity of the shape of the virtual object 40-1 may be calculated in any manner. As an example, the rotation center determination unit 113 may calculate complexity of the shape of the virtual object 40-1 using a dispersion value of depth at each position on the surface of the virtual object 40-1. Each position on the surface of the virtual object 40-1 may be each position on the entire surface of the virtual object 40-1, or may be each position of a portion (for example, a portion seen in a field of view, or the like) on the surface of the virtual object 40-1.

In the above, a description has been given of a case in which the rotation control unit 114 rotates a virtual object relatively to the viewpoint position of the user on the basis of the center of rotation. However, in a case in which the virtual object is rotated relatively to the viewpoint position of the user, the virtual object collides with a viewpoint camera, which may result in a situation in which a portion of the virtual object is not seen in the user's field of view. Consequently, the rotation control unit 114 may control a rotation track of a viewpoint position on the basis of a positional relationship between the center of rotation and the viewpoint position. Such an example will be described.

Figure 9:
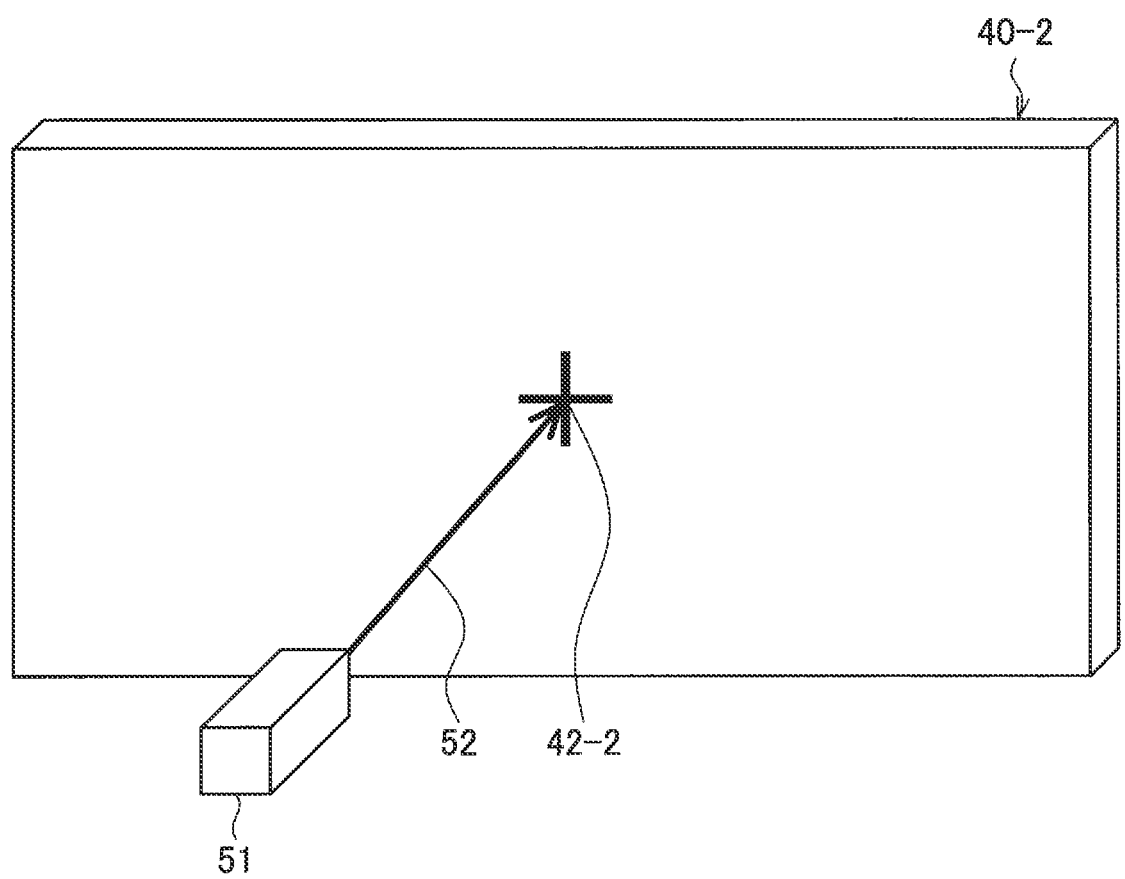
FIG. 9 is a diagram illustrating an example of a positional relationship between a virtual object and a viewpoint camera.

FIG. 9 is a diagram illustrating an example of a positional relationship between a virtual object and a viewpoint camera. Referring to FIG. 9, the line of sight 52 of the user extends from the viewpoint camera 51, and an intersection between the line of sight 52 and the virtual object 40-2 is determined as the center of rotation 42-2. A first solution for a case in which the virtual object 40-2 collides with the viewpoint camera 51 on the premise of a positional relationship between the virtual object 40-2 and the viewpoint camera 51 will be described with reference to FIG. 10, and a second solution therefor will be described with reference to FIG. 11.

FIG. 10 is a diagram illustrating the first solution for a case in which the virtual object 40-2 collides with the viewpoint camera 51. In FIG. 10, the positional relationship between the virtual object 40-2 and the viewpoint camera 51 illustrated in FIG. 9 is shown at such an angle as to be looked down from above. Here, a case in which a viewpoint position (the position of the viewpoint camera 51) is directly rotated with the center of rotation 42-2 as a reference is assumed. Referring to FIG. 10, a track 55-1 of the viewpoint camera 51 is illustrated.

Here, in the example illustrated in FIG. 10, a situation occurs in which the virtual object 40-2 protrudes to the outside of the track 55-1 of the viewpoint camera 51. For this reason, in a case in which the viewpoint camera 51 is rotated along the track 55-1, the virtual object 40-2 collides with the viewpoint camera 51. Consequently, in such a situation, the rotation control unit 114 may deform the track 55-1 so that the virtual object 40-2 falls within the track 55-2. In FIG. 10, the track 55-2 after deformation is shown by an ellipse, but the shape of the track 55-2 after deformation is not particularly limited.

It is possible to prevent a situation in which a portion of the virtual object is not seen in the user's field of view due to a collision between the virtual object 40-2 and the viewpoint camera 51 by the control of the track 55-1. On the other hand, since a distance between the center of rotation 42-2 and the viewpoint camera 51 is not constant by the control of the track 55-1, the size of the virtual object seen in the user's field of view is changed. Consequently, the rotation control unit 114 may make the size of the virtual object seen in the user's field of view constant by rotating the viewpoint camera 51 and controlling zooming of the viewpoint camera 51.

FIG. 11 is a diagram illustrating the second solution for a case in which the virtual object 40-2 collides with the viewpoint camera 51. In FIG. 11, the positional relationship between the virtual object 40-2 and the viewpoint camera 51 illustrated in FIG. 9 is shown at such an angle as to be looked down from above. Similarly to the example illustrated in FIG. 10, a case in which a viewpoint position (the position of the viewpoint camera 51) is directly rotated with the center of rotation 42-2 as a reference is assumed. Referring to FIG. 11, the track 55-1 of the viewpoint camera 51 is illustrated.

Here, also in the example illustrated in FIG. 11, a situation occurs in which the virtual object 40-2 protrudes to the outside of the track 55-1 of the viewpoint camera 51. For this reason, in a case in which the viewpoint camera 51 is rotated along the track 55-1, the virtual object 40-2 collides with the viewpoint camera 51. Consequently, in such a situation, the rotation control unit 114 may enlarge the track 55-1 so that the virtual object 40-2 falls within a track 55-3. In FIG. 10, the track 55-3 after enlargement is indicated by a circle.

In the example illustrated in FIG. 11, the track 55-1 before enlargement and the track 55-3 after enlargement are not continuous with each other, unlike the example illustrated in FIG. 10. For this reason, it is necessary to move the viewpoint camera 51 from the track 55-1 before enlargement to the track 55-3 after enlargement. The movement of the viewpoint camera 51 from the track 55-1 before enlargement to the track 55-3 after enlargement may be automatically controlled by the rotation control unit 114, or may be performed manually by the user in a case in which the rotation control unit 114 instructs the user to move the viewpoint camera 51.

Similarly to the example illustrated in FIG. 10, also in the example illustrated in FIG. 11, it is possible to prevent a situation in which a portion of the virtual object is not seen in the user's field of view due to a collision between the virtual object 40-2 and the viewpoint camera 51 by the control of the track 55-1.

In the above, an example in which a rotation track at a viewpoint position is controlled has been described. Here, a rotation speed of an object may be constant or variable. In a case in which a rotation speed of an object is variable, the rotation speed may be controlled in any manner. For example, the rotation control unit 114 may rotate the object relatively to the viewpoint position of the user in accordance with a rotation speed based on a parameter related to the object.

Here, the type of parameter related to the object is not particularly limited. For example, the parameter related to the object may include at least any one of complexity of the shape of the object, the size of the object, or a distance between a viewpoint position and the object.

For example, since it is assumed that an increase in complexity of the shape of the object leads to an increase in time required to observe the object, a rotation speed may be preferably low. The complexity of the shape of the object may be calculated as described above. In addition, since it is assumed that an increase in the size of the object leads to an increase in time required to observe the object, a rotation speed may be preferably low.

In addition, since it is assumed that a decrease in a distance between the viewpoint position and the object leads to an increase in the size of the object seen in a field of view and a time is required to observe the object, a rotation speed may be preferably low. An example of a relationship between a rotation speed and a distance between a viewpoint position and an object will be described by assuming a case in which the object is a virtual object. Here, the object may be a real object instead of a virtual object.

Figure 12:
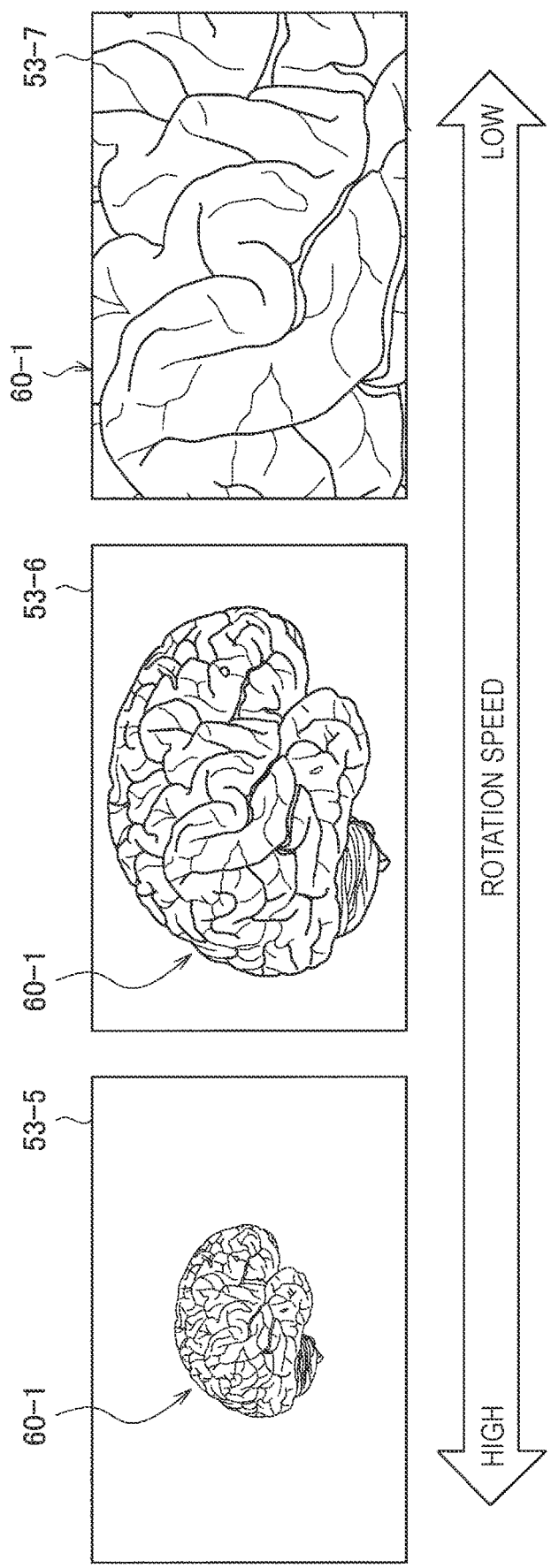
FIG. 12 is a diagram illustrating an example of a relationship between a rotation speed and a distance between a viewpoint position and a virtual object.

FIG. 12 is a diagram illustrating an example of a relationship between a rotation speed and a distance between a viewpoint position and a virtual object. Referring to FIG. 12, the virtual object 60-1 having the longest distance from a viewpoint position is seen in a field of view 53-5. In this case, since the virtual object 60-1 is seen in the smallest size in the field of view 53-5, it is assumed that the user roughly observes the entire virtual object 60-1. For this reason, the rotation control unit 114 may set the highest rotation speed.

In addition, referring to FIG. 12, the virtual object 60-1 having a slightly short distance from the viewpoint position is seen in the field of view 53-6. In this case, since the virtual object 60-1 is seen in a slightly large size in the field of view 53-6, it is assumed that the user observes the virtual object 60-1 slightly minutely. For this reason, the rotation control unit 114 may preferably set a slightly low rotation speed.

In addition, referring to FIG. 12, the virtual object 60-1 having the shortest distance from the viewpoint position is seen in a field of view 53-7. In this case, since the virtual object 60-1 is seen in the largest size in the field of view 53-7, it is assumed that the user observes the virtual object 60-1 further minutely. For this reason, the rotation control unit 114 may set the lowest rotation speed.

In the above, an example in which a rotation speed of an object is controlled has been described. Incidentally, although an example in which the instruction direction detection unit 120 detects a line of sight of a user has been described above, a line of sight of a user may not be detected by the instruction direction detection unit 120. For example, in a case in which the instruction direction detection unit 120 includes an imaging device, an eye region may not fall within an imaging range of the imaging device, or a line of sight of the user may not be detected due to the eye region being unclearly seen in an image.

Consequently, in a case in which a line of sight of the user is not detected, the output control unit 111 may control the output of information indicating that a line of sight is not detected. The information indicating that a line of sight is not detected may be output by a display as visual information, may be output by a sound output device as sound information, or may be output by a tactile presentation device as tactile information. Hereinafter, a description will be given of an example in which information indicating that a line of sight is not detected is output by a display as visual information. Note that, also in the following description, a virtual object is assumed as an example of an object.

Figure 13:
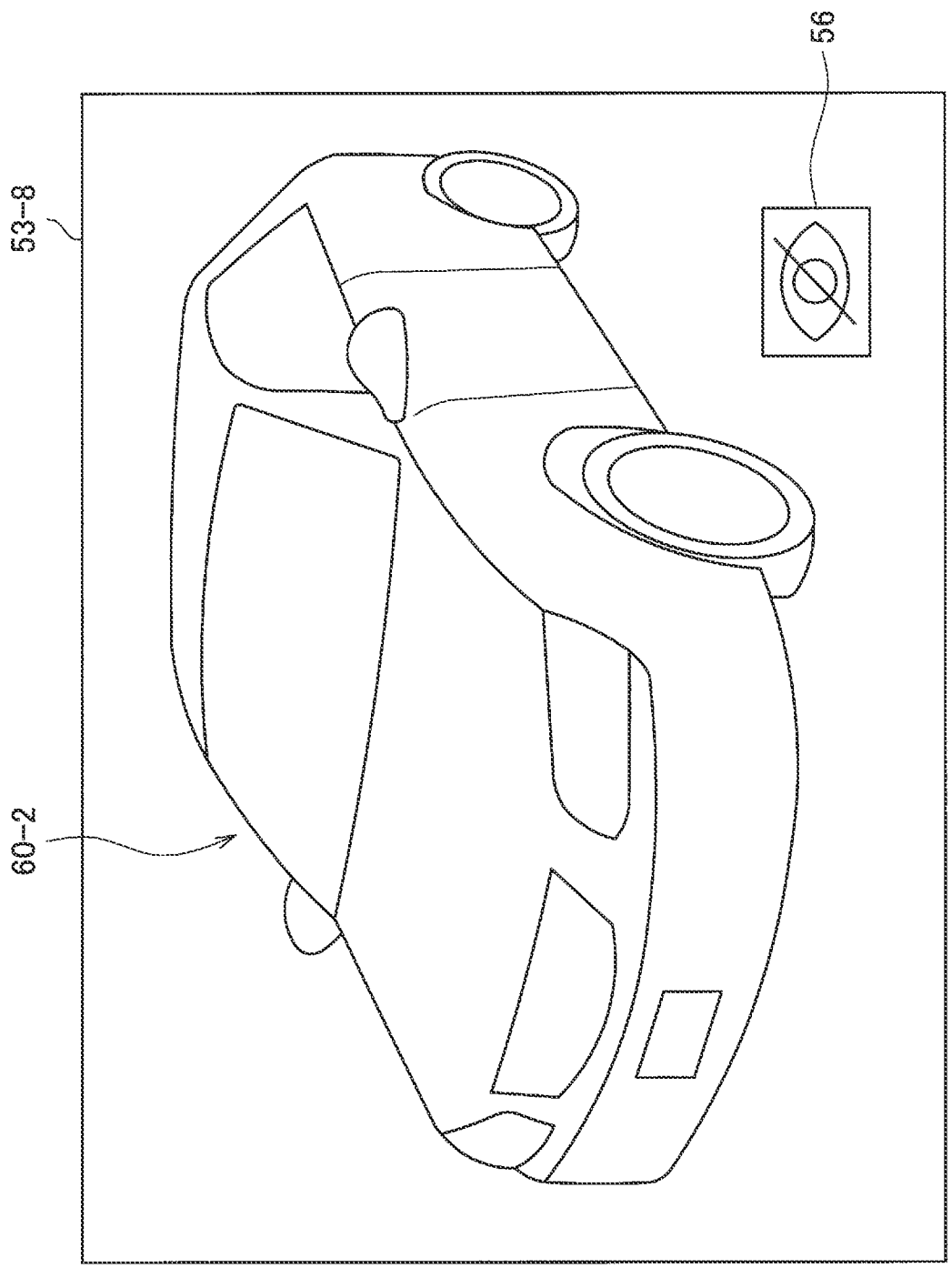
FIG. 13 is a diagram illustrating an example of a relationship between a rotation speed and a distance between a viewpoint position and a virtual object.

FIG. 13 is a diagram illustrating an example of output of information indicating that a line of sight is not detected. Referring to FIG. 13, a virtual object 60-2 is seen in a field of view 53-8. However, a case in which a line of sight of the user is not detected due to the user not viewing the virtual object 60-2 is assumed. In such a case, the output control unit 111 controls the output of information indicating that a line of sight of the user is not detected. In the example illustrated in FIG. 13, the output of visual information (non-detection information 56) indicating that a line of sight of the user is not detected is controlled by the output control unit 111. The shape, size, color, and the like of the non-detection information 56 are not particularly limited.

Note that, in a case in which a line of sight of the user is not detected, an instruction direction other than a line of sight may be used instead of a line of sight in a case in which an instruction direction other than a line of sight can be detected. The instruction direction other than a line of sight may be any of the above-described various instruction directions. Further, the center of rotation based on the user's previous instruction direction may be used in a case in which a line of sight of the user is not detected, or a position which is set as a default may be used as the center of rotation in a case in which the user's instruction direction was not detected in the past.

In the above, an example of output of information indicating that a line of sight is not detected has been described. In the above, a case in which a rotation range of an object is not limited has been described. However, a rotation range of an object may also be limited for some reason. For example, in a case in which an object is a virtual object, only an image obtained by imaging the virtual object from a certain angle may also be prepared. Alternatively, in a case in which an object is a real object, a case in which a viewpoint camera is rotated by a camera arm, or the like, the rotation of the viewpoint camera may also be limited. Alternatively, the rotation of a real object may also be limited.

Consequently, the output control unit 111 may control the output of information indicating a rotatable range of an object relative to a viewpoint position. Then, the user can easily understand how much the object can be rotated. Hereinafter, a description will be given by assuming a case in which an object is a virtual object.

Figure 14:
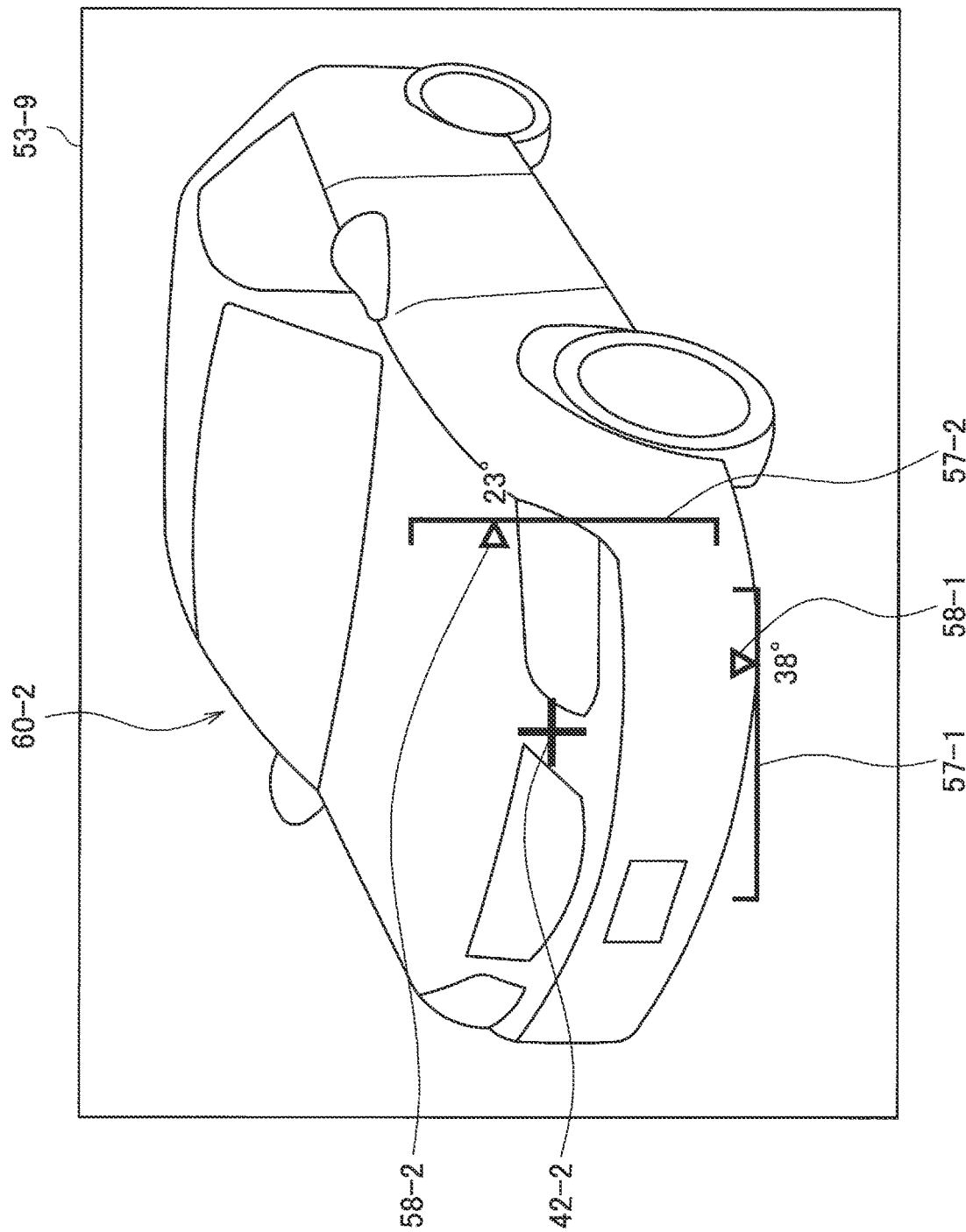
FIG. 14 is a diagram illustrating an example of output of information indicating a rotatable range.

FIG. 14 is a diagram illustrating an example of output of information indicating a rotatable range. Referring to FIG. 14, the virtual object 60-2 is seen in the field of view 53-1. In addition, a center of rotation 42-2 of the virtual object 60-2 is illustrated. For example, a case in which the virtual object 60-2 is rotatable in the horizontal direction and the vertical direction is assumed. In this case, as illustrated in FIG. 14, the output control unit 111 may output information 57-1 indicating a rotatable range in the horizontal direction and information 57-2 indicating a rotatable range in the vertical direction.

Note that output of a mark 58-1 indicating the current rotation angle of the virtual object 60-2 in the horizontal direction and output of a mark 58-2 indicating the current rotation angle of the virtual object 60-2 in the vertical direction are controlled by the output control unit 111. When the virtual object 60-2 is rotated counterclockwise when seen from above, the mark 58-1 indicating a rotation angle in the horizontal direction is moved leftward by a length corresponding to the rotation. On the other hand, when the virtual object 60-2 is rotated clockwise when seen from above, the mark 58-1 indicating a rotation angle in the horizontal direction is moved rightward by a length corresponding to the rotation.

In addition, when the virtual object 60-2 is rotated counterclockwise when seen from the right, the mark 58-2 indicating a rotation angle in the vertical direction is moved upward by a length corresponding to the rotation. On the other hand, when the virtual object 60-2 is rotated clockwise when seen from the right, the mark 58-2 indicating a rotation angle in the vertical direction is moved downward by a length corresponding to the rotation.

Each of the right and left ends of the information 57-1 indicating a rotatable range indicates a position where the mark 58-1 indicating a rotation angle in the horizontal direction reaches when a rotation angle of the virtual object 60-2 in the horizontal direction reaches a limit. On the other hand, each of the upper and lower ends of the information 57-2 indicating a rotatable range indicates a position where the mark 58-2 indicating a rotation angle in the vertical direction reaches when a rotation angle of the virtual object 60-2 in the vertical direction reaches a limit.

In the example illustrated in FIG. 14, an angel in a case in which the front surface of the virtual object 60-2 is seen in a field of view 53-9 faces directly frontward is set to be a reference angle. Consequently, FIG. 14 illustrates a case in which a rotation angle of the virtual object 60-2 in the horizontal direction may vary from +45 degrees to +45 degrees with the reference angle as a reference. In addition. FIG. 14 illustrates a case in which the current rotation angle of the virtual object 60-2 in the horizontal direction is +38 degrees with the reference angle as a reference.

In addition, FIG. 14 illustrates a case in which a rotation angle of the virtual object 60-2 in the vertical direction may vary from 0 degrees to +30 degrees with the reference angle as a reference. In addition. FIG. 14 illustrates a case in which the current rotation angle of the virtual object 60-2 in the vertical direction is +23 degrees with the reference angle as a reference. Note that the ranges of the reference angle and the rotational angle of the virtual object 60-2 are not limited to the example illustrated in FIG. 14.

In the above, an example of output of information indicating a rotatable range of an object has been described. However, in a case in which a rotation of an object relative to a viewpoint position has reached a limit of a rotatable range, the output control unit 111 may control the output of information indicating that the rotation of the object relative to the viewpoint position has reached the limit of the rotatable range, in addition to or instead of the output of information indicating a rotatable range. Then, the user can easily understand that the rotation of the object has reached a limit.

Here, the information indicating that the rotation of the object has reached a limit may be output by a display as visual information, may be output by a sound output device as sound information, or may be output by a tactile presentation device as tactile information. Hereinafter, a description will be given of an example in which information indicating that the rotation of an object has reached a limit is output by a display as visual information. Note that, also in the following description, a description will be given by assuming a case in which an object is a virtual object.

Figure 15:
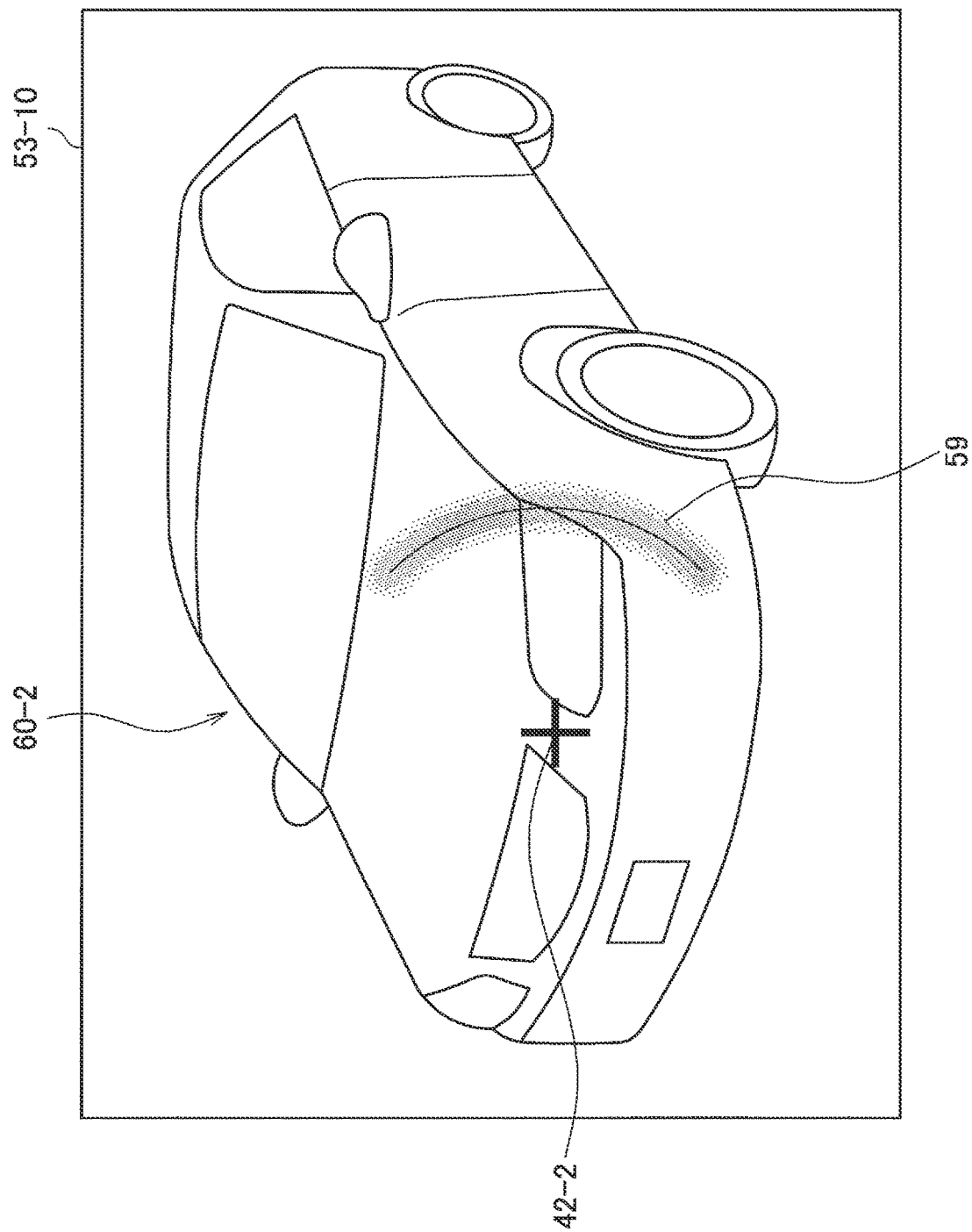
FIG. 15 is a diagram illustrating an example of output of information indicating that the rotation of a virtual object has reached a limit.

FIG. 15 is a diagram illustrating an example of output of information indicating that the rotation of the virtual object 60-2 has reached a limit. Referring to FIG. 15, the virtual object 60-2 is seen in a field of view 53-10. Here, the user performs a rotating operation on the virtual object 60-2 (counterclockwise when seen from above), but a case in which the rotation of the virtual object 60-2 in the direction has reached a limit is assumed. In such a case, the output control unit 111 controls the output of information indicating that the rotation of the virtual object 60-2 has reached a limit.

In the example illustrated in FIG. 15, the output of visual information (limit reach information 59) indicating information indicating that the rotation of the virtual object 60-2 has reached a limit is controlled by the output control unit 111. The shape, size, color, and the like of the limit reach information 59 are not particularly limited. However, when the limit reach information 59 is displayed in a region where the virtual object is rotated to the back side in a surface on the front side of the virtual object 60-2 (displayed in a right region of the center of rotation 42-2 in the example illustrated in FIG. 15 because the right region of the center of rotation 42-2 is rotated to the back side in a case in which a rotation direction is a counterclockwise direction when seen from above), the user can intuitively understand a direction in which rotation has reached a limit.

Note that the output control unit 111 may continuously output the limit reach information 59 as long as the rotation angle of the virtual object 60-2 reaching a limit is not cancelled after the limit reach information 59 is output once. Alternatively, the output control unit 111 may automatically erase the limit reach information 59 at a stage where a predetermined period of time elapses after the limit reach information 59 is output once. Then, it is possible to reduce troublesomeness felt by the user due to the limit reach information 59 being continuously output.

In the above, an example of output of information indicating that the rotation of an object has reached a limit has been described. In the above, a description has been given of an example in which a rotation track of an object is not particularly changed even when the center of rotation of the object is distant from a viewpoint position. However, in a case in which the center of rotation of the object is distant from the viewpoint position, it may be difficult to grasp the rotation of the object (for example, it may seem that the object is moving in parallel).

Consequently, in a case in which the center of rotation is positioned farther from the viewpoint position than a predetermined distance, the rotation center determination unit 113 may bring the center of rotation close to the viewpoint position. Then, it is easy for the user to grasp the rotation of the object. The predetermined distance may be determined in advance or may be capable of being set by the user.

In addition, an example in which an object is two-dimensionally displayed on a plane by the output unit 160 has been mainly described above. However, an object may be three-dimensionally displayed on a space (3D display may also be performed). Alternatively, in a case in which the user is present at a viewpoint position, the user may directly observe a real object in a real space. In such a case, it is assumed that a convergence angle of the user changes due to the position of the object, observed by the user, which depends on a depth.

Consequently, in a case in which the object is three-dimensionally displayed on a space, the rotation center determination unit 113 may calculate depth information regarding the object in the three-dimensional space on the basis of the convergence angle of the user. In addition, the rotation center determination unit 113 may determine the center of rotation on the basis of the calculated depth information regarding the object and an instruction direction. More specifically, the rotation center determination unit 113 may determine an intersection between a surface indicated by the depth information and the instruction direction as the center of rotation. For example, the rotation center determination unit 113 may detect a convergence angle of the user from an image obtained by an imaging device.

Figure 16:
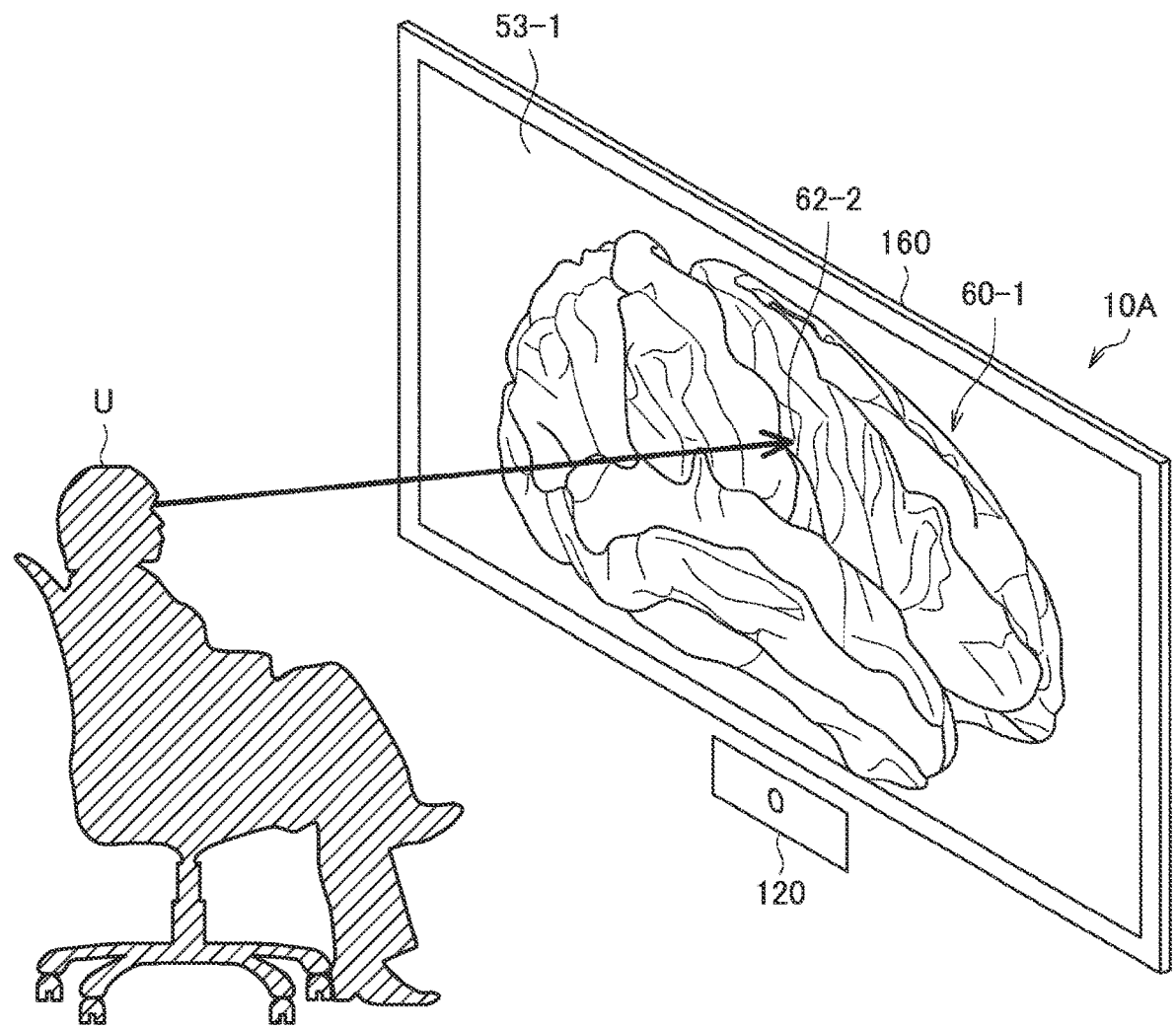
FIG. 16 is a diagram illustrating a second example of the information processing device according to the first embodiment of the present disclosure.
Figure 17:
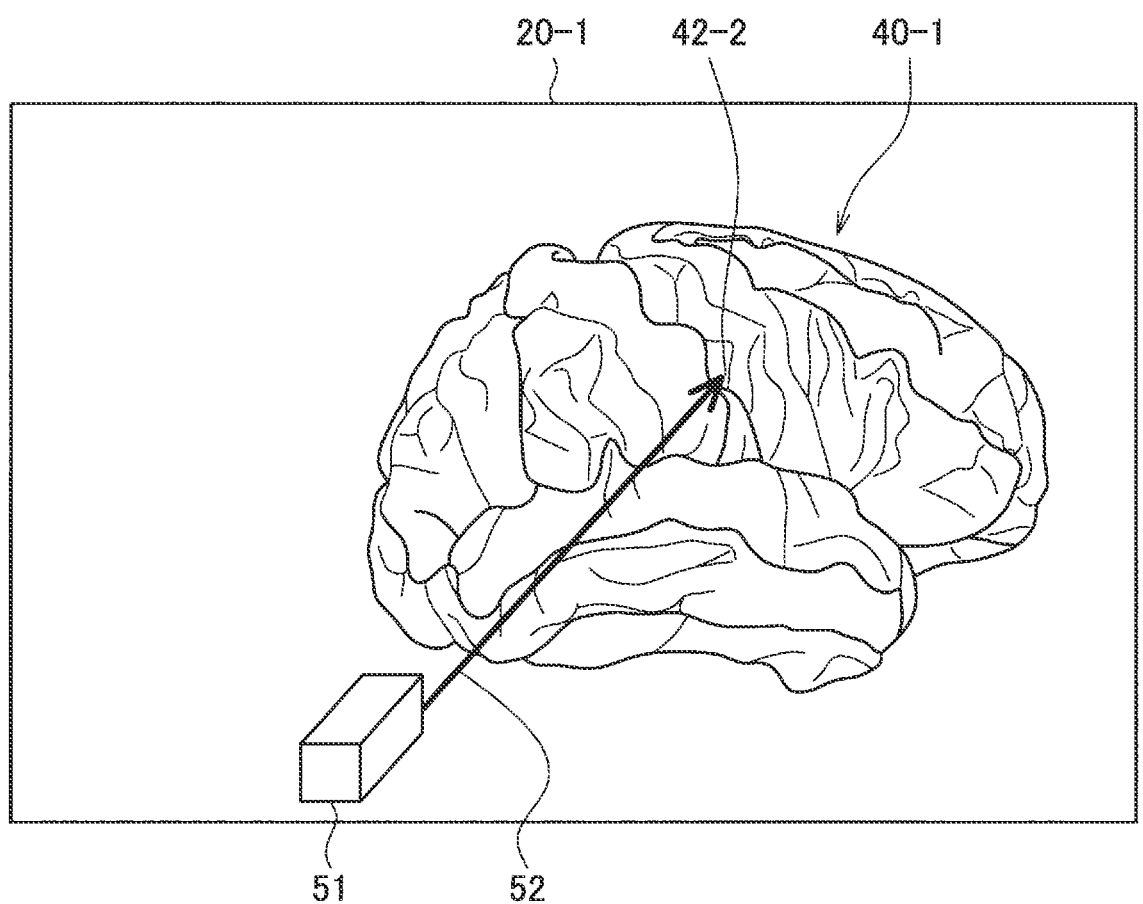
FIG. 17 is a diagram illustrating an example of a virtual object in a virtual space in the second example of the information processing device according to the first embodiment of the present disclosure.

In the above, the first example of the information processing device 10A according to the first embodiment of the present disclosure has been described. Subsequently, a second example of the information processing device 10A according to the first embodiment of the present disclosure will be described. FIG. 16 is a diagram illustrating the second example of the information processing device 10A according to the first embodiment of the present disclosure. FIG. 17 is a diagram illustrating an example of a virtual object in a virtual space in the second example of the information processing device 10A according to the first embodiment of the present disclosure. As illustrated in FIG. 16, the information processing device 10A is installed in a room where a user U is present, and includes an instruction direction detection unit 120 and an output unit 160.

As illustrated in FIG. 17, in the second example, a case in which the information processing device 10A is a television device is mainly assumed. Referring to FIG. 17, a virtual object 40-1 is present in a virtual space 20-1, and a viewpoint camera 51 is virtually present at a viewpoint position. In addition, an image obtained by imaging the virtual object 40-1 by the viewpoint camera 51 is displayed by the output unit 160 under the control of the output control unit 111, so that a field of view 53-1 is provided to the user U. Referring to FIG. 16, a 3D model of a brain is illustrated as an example of the virtual object 60-1 seen in the field of view 53-1.

Also in the second example, the instruction direction detection unit 120 detects a line of sight of the user U in a real space, and detects a line of sight 52 of the user U in the virtual space 20-1 corresponding to the line of sight of the user U in the real space as an example of an instruction direction of the user U. In this case, in the second example, the instruction direction detection unit 120 detects an observation point of the user U in the field of view 53-1 on the basis of the line of sight of the user U in the real space, and detects the line of sight 52 of the user U in the virtual space 20-1 corresponding to the observation point of the user U in the field of view 53-1 as an example of an instruction direction of the user U. Also in the second example, the virtual object 40-1 is relatively rotated similar to the first example.

Figure 18:
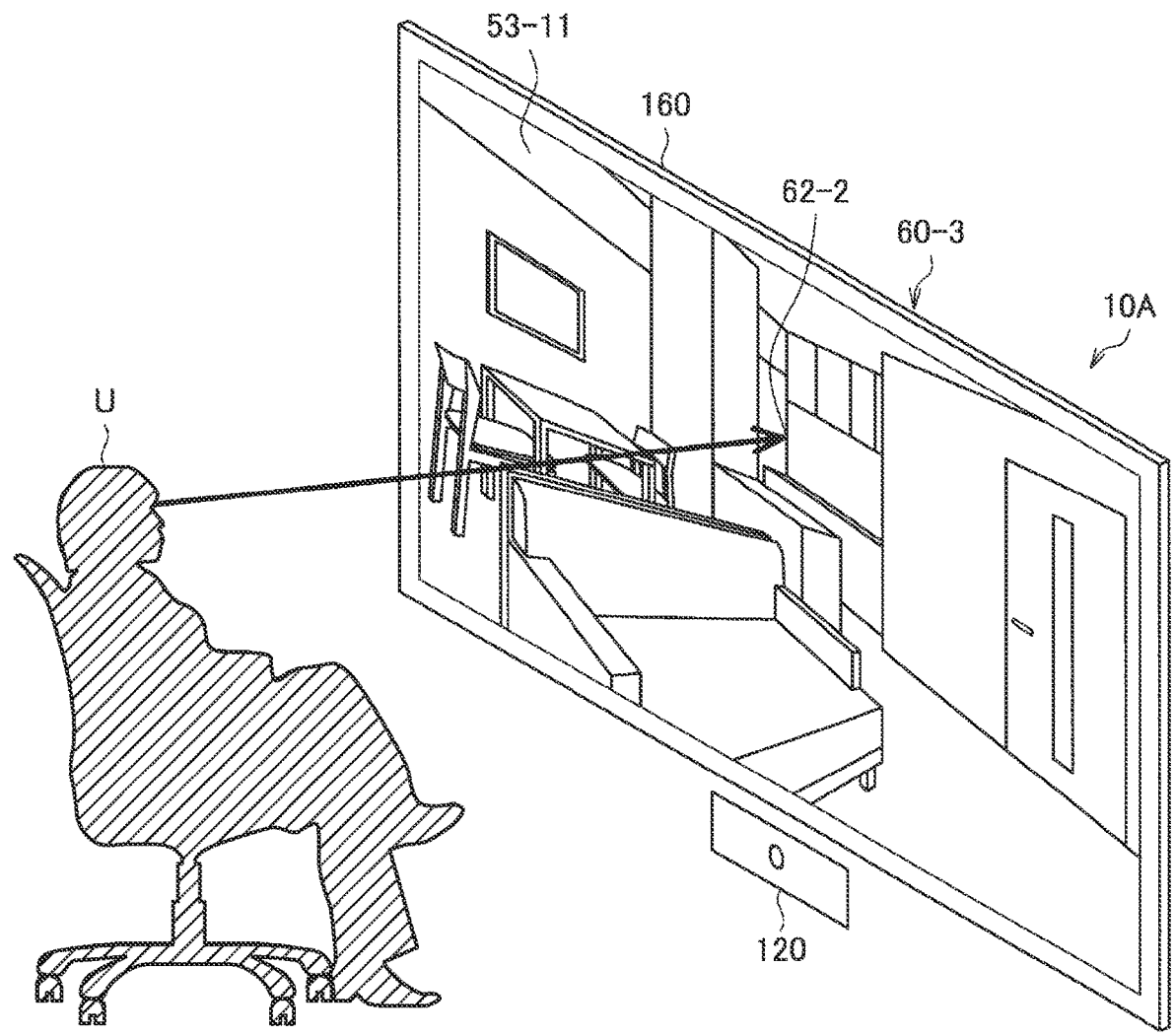
FIG. 18 is a diagram illustrating a third example of the information processing device according to the first embodiment of the present disclosure.
Figure 19:
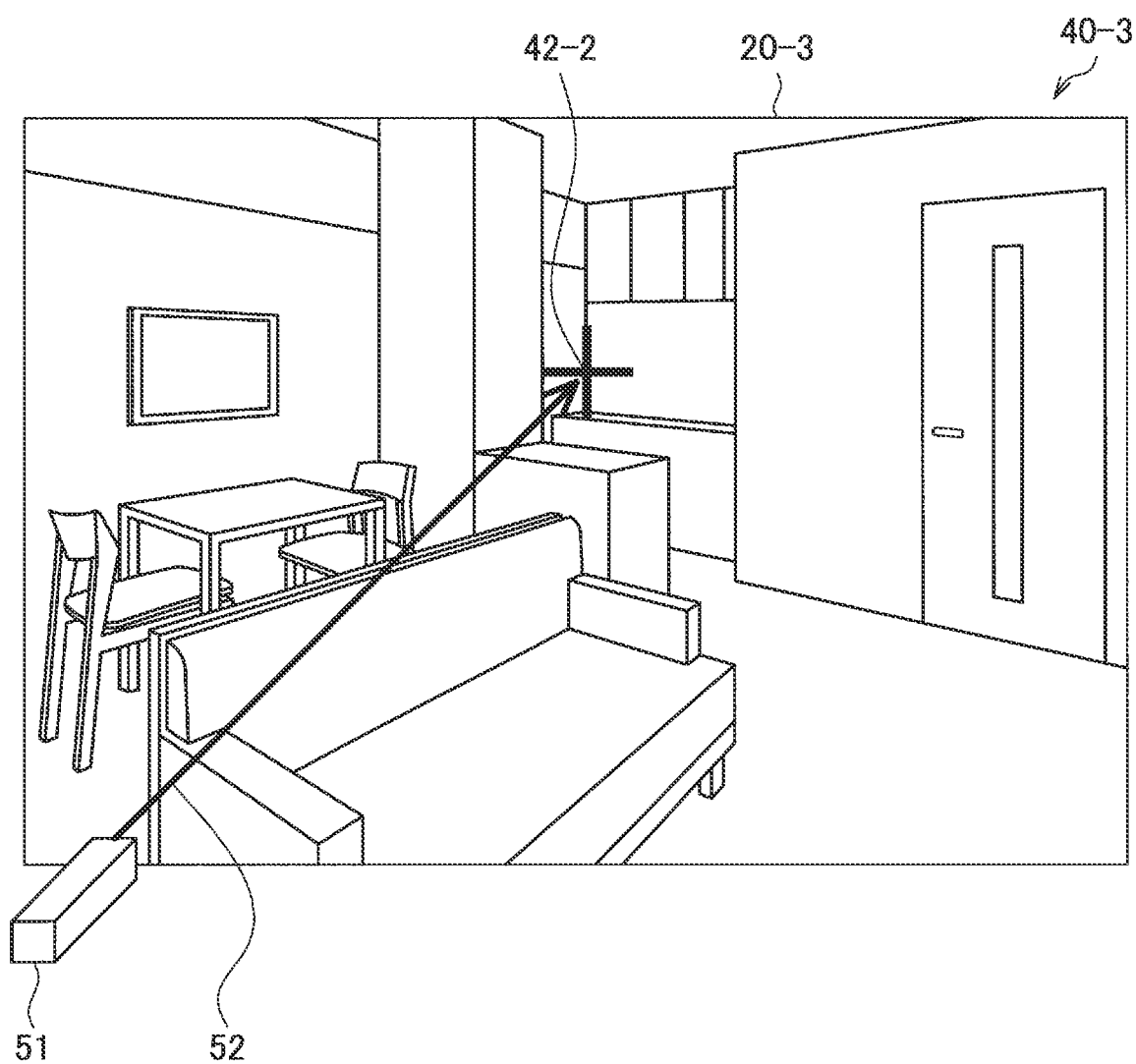
FIG. 19 is a diagram illustrating an example of a virtual object in a virtual space in the third example of the information processing device according to the first embodiment of the present disclosure.

FIG. 18 is a diagram illustrating a third example of the information processing device 10A according to the first embodiment of the present disclosure. FIG. 19 is a diagram illustrating an example of a virtual object in a virtual space in the third example of the information processing device 10A according to the first embodiment of the present disclosure. As illustrated in FIG. 18, the information processing device 10A is installed in a room where a user U is present, and includes an instruction direction detection unit 120 and an output unit 160.

As illustrated in FIG. 19, also in the third example, a case in which the information processing device 10A is a television device is mainly assumed. Referring to FIG. 19, a virtual object 40-3 is present in a virtual space 20-3, and a viewpoint camera 51 is virtually present at a viewpoint position. In addition, an image obtained by imaging the virtual object 40-3 by the viewpoint camera 51 is displayed by the output unit 160 under the control of the output control unit 111, so that a field of view 53-11 is provided to the user U. Referring to FIG. 18, a 3D model of a room is illustrated as an example of the virtual object 60-3 seen in the field of view 53-11. Also in the third example, the virtual object 40-3 is relatively rotated similar to the second example.

Figure 20:
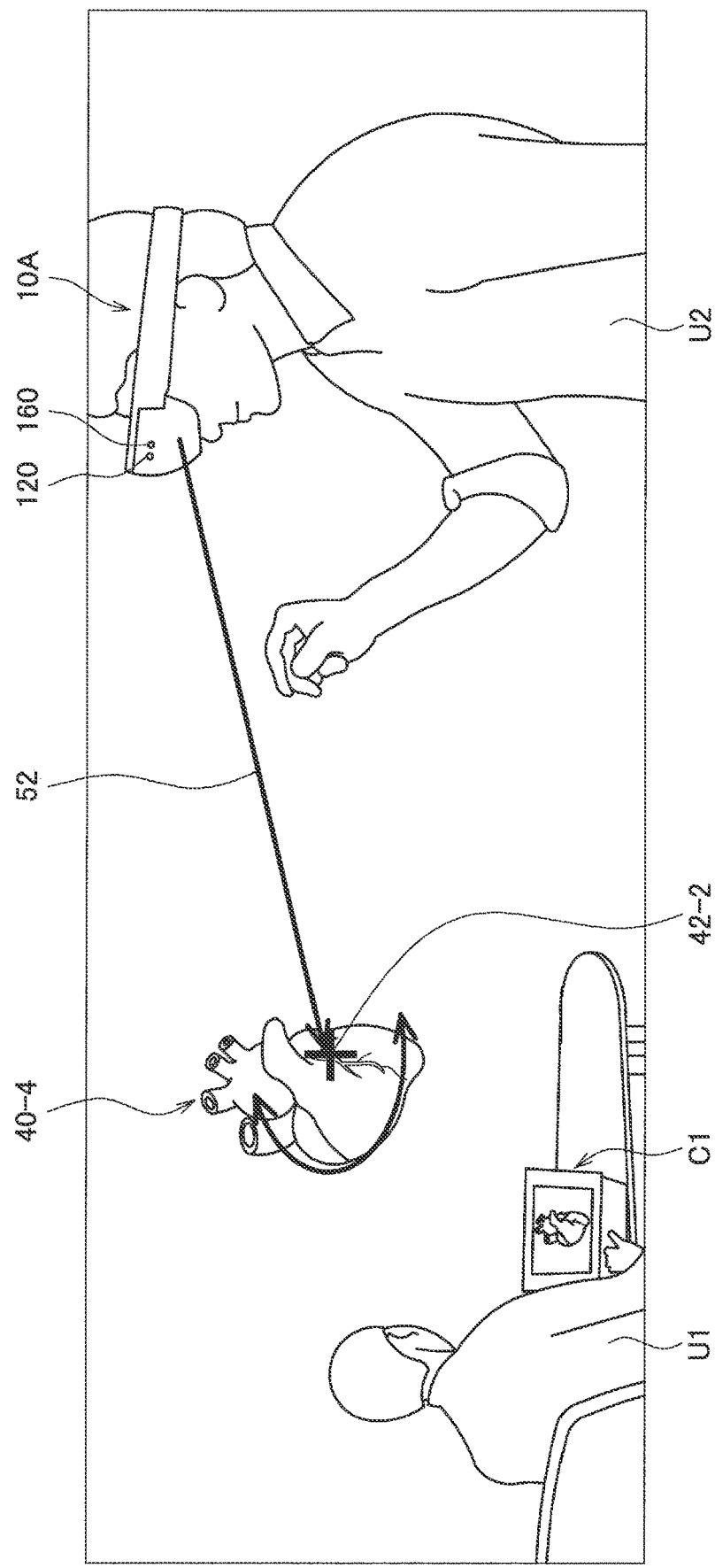
FIG. 20 is a diagram illustrating a fourth example of the information processing device according to the first embodiment of the present disclosure.

FIG. 20 is a diagram illustrating a fourth example of the information processing device 10A according to the first embodiment of the present disclosure. As illustrated in FIG. 20, the information processing device 10A is worn on the head of a user U2, and includes an instruction direction detection unit 120 and an output unit 160. A user U different from the user U2 is watching a screen of a computer C1. The computer C1 manages 3D model information, displays a virtual object based on the 3D model information on the screen, and transmits the 3D model information to the information processing device 10A. Also in the fourth example, a case in which the information processing device 10A is an HMD for AR is mainly assumed similar to the first example.

Referring to FIG. 20, a virtual object 40-4 is present in a virtual space, and a viewpoint camera is virtually present at a viewpoint position. In addition, an image obtained by imaging the virtual object 40-4 by the viewpoint camera is displayed by the output unit 160 under the control of the output control unit 111, so that a field of view is provided to the user U. Referring to FIG. 20, a heart is illustrated as an example of the virtual object 40-4. Also in the fourth example, the virtual object 40-4 is relatively rotated similar to the first example.

Figure 21:
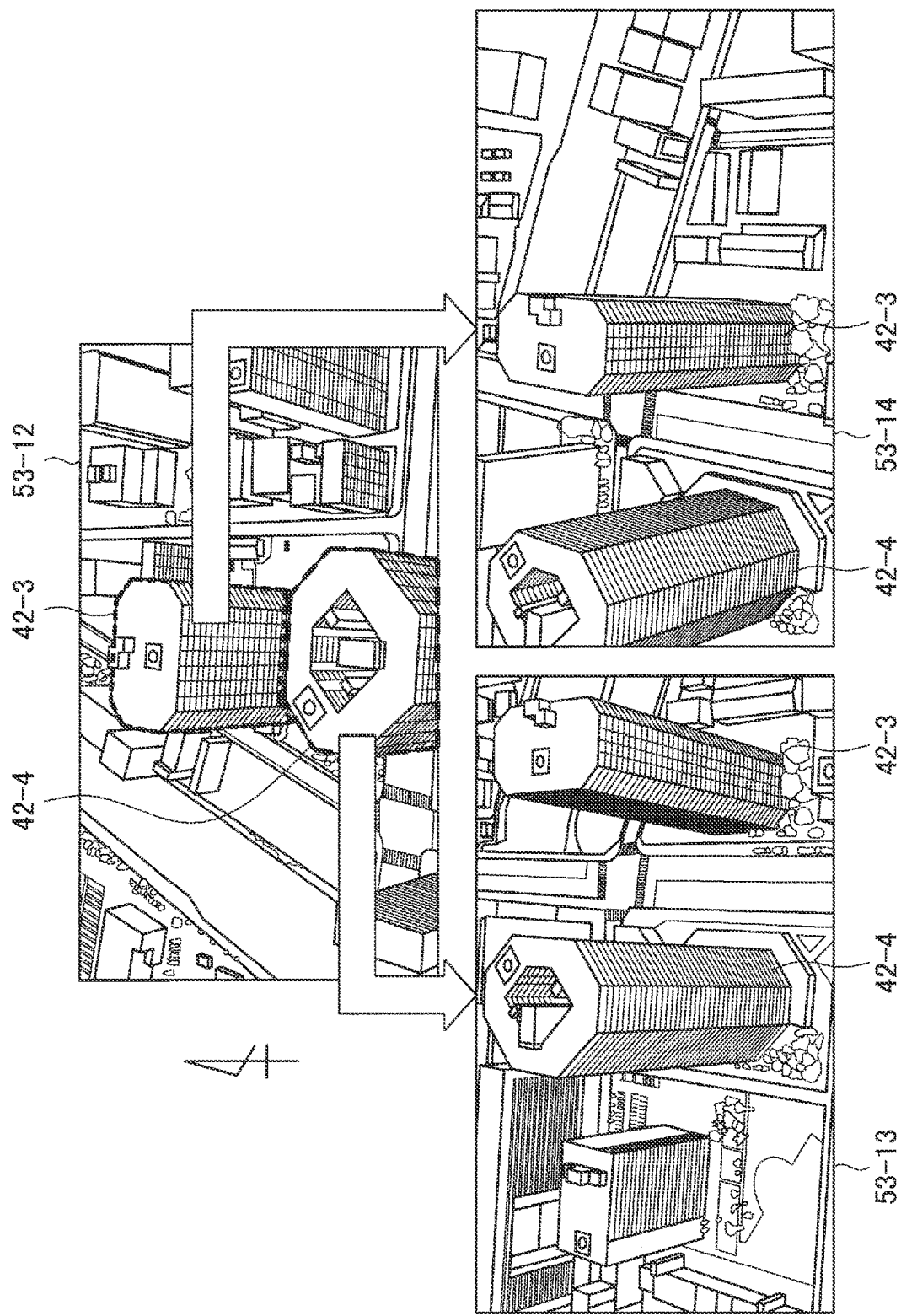
FIG. 21 is a diagram illustrating a fifth example of the information processing device according to the first embodiment of the present disclosure.

FIG. 21 is a diagram illustrating a fifth example of the information processing device 10A according to the first embodiment of the present disclosure. Also in the fifth example, a case in which the information processing device 10A is worn on the head of a user is assumed. Also in the fifth example, a case in which the information processing device 10A is an HMD for AR is mainly assumed similar to the first example.

Also in the fifth example, a landscape photograph is present in a virtual space as a virtual object, and a viewpoint camera is virtually present at a viewpoint position. In addition, an image obtained by imaging the landscape photograph by the viewpoint camera is displayed by the output unit 160 under the control of the output control unit 111, so that a field of view 53-12 is provided to the user.

For example, when a line of sight is applied to a building seen in a lower portion in the field of view 53-12, the position of the building seen in the lower portion is determined as a center of rotation 42-4. In such a situation, when an operation of rotating the landscape photograph clockwise is performed by the user, the landscape photograph is rotated clockwise and the landscape photograph is moved so that the building seen in the lower portion is positioned at the center of the field of view 53-12 (field of view 53-13).

On the other hand, when a line of sight is applied to the building seen in an upper portion in the field of view 53-12, the position of the building seen in the upper portion is determined as a center of rotation 42-3. In such a situation, when an operation of rotating the landscape photograph clockwise is performed by the user, the landscape photograph is rotated clockwise and the landscape photograph is moved so that the building seen in the upper portion is positioned at the center of the field of view 53-12 (field of view 53-14).

Note that, although an object to which a viewpoint is applied is a building in the example illustrated in FIG. 21, an object to which a viewpoint is applied may be something other than the building or may be a section. Further, in the example illustrated in FIG. 21, an object to be rotated is the landscape photograph, an object to be rotated may be something other than the landscape photograph or may be a region. In addition, a case in which the landscape photograph is two-dimensional data has been assumed here. However, in a case in which the landscape photograph is three-dimensional data, an intersection between the building and a line of sight may be three-dimensionally determined as the center of rotation, and the landscape photograph may be three-dimensionally rotated.

In the above, the first embodiment of the present disclosure has been described.

2. DESCRIPTION OF SECOND EMBODIMENT

Subsequently, a second embodiment of the present disclosure will be described. In the second embodiment of the present disclosure, an example in which a real object in a real space is rotated will be mainly described. Note that the functions of rotation of a virtual object which have already been described in the first embodiment of the present disclosure may also be applied to functions of rotation of a real object. Consequently, in the second embodiment of the present disclosure, functions of rotation of a virtual object which are different from those among functions of rotation of a real object will be mainly described.

[2.1. Functional Configuration Example]

Figure 22:
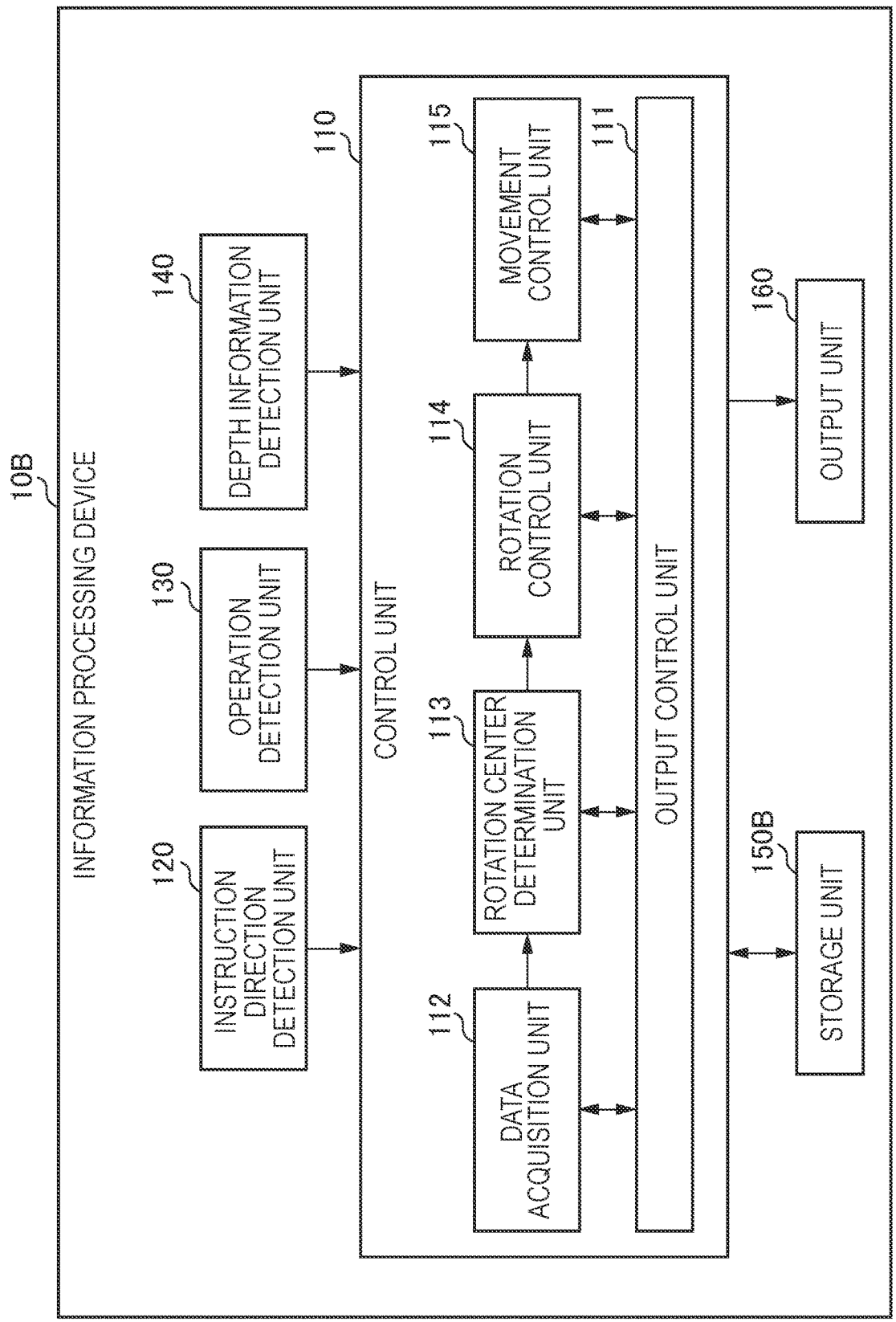
FIG. 22 is a diagram illustrating a functional configuration example of an information processing device according to a second embodiment of the present disclosure.

First, a functional configuration example of an information processing device according to the second embodiment of the present disclosure will be described. FIG. 22 is a diagram illustrating a functional configuration example of an information processing device according to the second embodiment of the present disclosure. As illustrated in FIG. 22, an information processing device 10B includes a depth information detection unit 140, and is different from the information processing device 10B according to the first embodiment of the present disclosure in that a storage unit 150B does not store 3D model information 151. Hereinafter, these differences will be mainly described.

Note that, in the present specification, an example in which a control unit 110, an instruction direction detection unit 120, an operation detection unit 130, a depth information detection unit 140, a storage unit 150B, and an output unit 160 are present inside the same device (information processing device 10B) will be mainly described. However, positions where these blocks are present are not particularly limited. For example, as will be described later, some of these blocks may be present in a server or the like.

The depth information detection unit 140 detects depth information regarding a real object in a real space. Here, a method of detecting depth information regarding a real object is not particularly limited. For example, the depth information detection unit 140 may detect the depth information regarding the real object by a laser range finder, a depth sensor, or a stereo camera, or the depth information regarding the real object may be detected on the basis of a focal length of a camera lens, the size of an image captured by a camera, and the size of an image sensor.

The functional configuration example of the information processing device 10B according to the second embodiment of the present disclosure has been described above.

[2.2. Overall Function]

Figure 23:
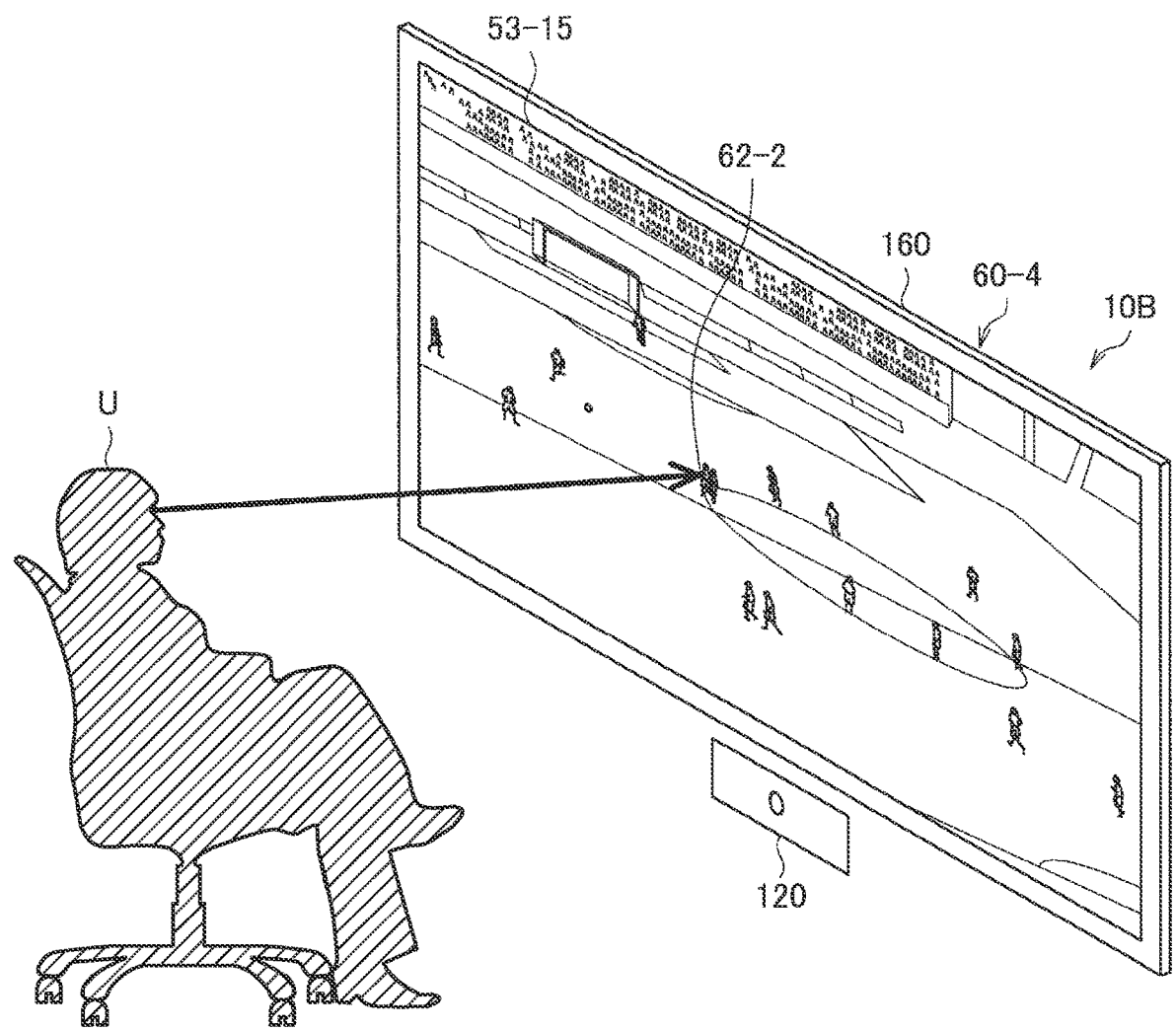
FIG. 23 is a diagram illustrating a first example of the information processing device according to the second embodiment of the present disclosure.
Figure 24:
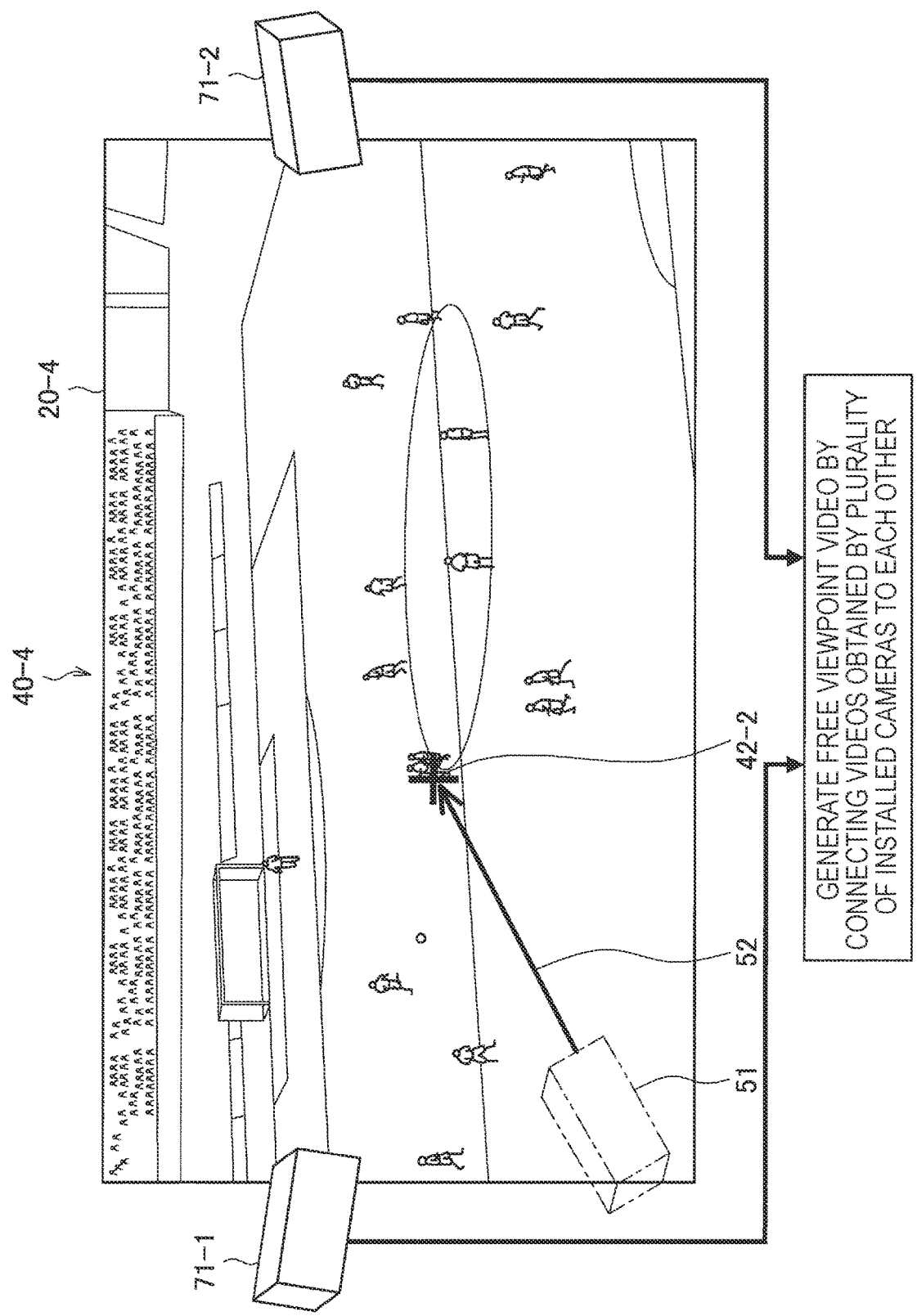
FIG. 24 is a diagram illustrating an example of a real object in a real space in the first example of the information processing device according to the second embodiment of the present disclosure.

Subsequently, details of functions of the information processing device 10B according to the second embodiment of the present disclosure will be described. FIG. 23 is a diagram illustrating a first example of the information processing device 10B according to the second embodiment of the present disclosure. FIG. 24 is a diagram illustrating an example of a real object in a real space in the first example of the information processing device 10B according to the second embodiment of the present disclosure. As illustrated in FIG. 23, the information processing device 10B is installed in a room where a user U is present, and includes an instruction direction detection unit 120 and an output unit 160.

As illustrated in FIG. 23, in the first example, a case in which the information processing device 10B is a television device is mainly assumed. Referring to FIG. 24, a real object 40-4 is present in a real space 20-4, and an installed camera 71-1 and an installed camera 71-2 each of which images the real object 40-4 at different positions are present. The number of installed cameras 71 is not particularly limited. In addition, a virtual viewpoint camera 51 is installed at a realistic viewpoint position in the real space 20-4. In addition, videos obtained by imaging the real object 40-4 by each of the installed camera 71-1 and the installed camera 71-2 are connected to each other by an output control unit 111, so that a free viewpoint video captured by the virtual viewpoint camera 51 is generated.

The free viewpoint video generated by the output control unit 111 is displayed by the output unit 160, so that a field of view 53-15 is provided to the user U. Referring to FIG. 23, a soccer field (including players) is illustrated as an example of a real object 60-4 seen in the field of view 53-15. Note that the real object 60-4 is not limited to the soccer field. For example, the real object 60-4 may be a live hall where music is played, or may be a monitoring target region to be imaged by a monitoring camera.

In the second embodiment of the present disclosure, the instruction direction detection unit 120 detects a line of sight of the user U in a space where the user U is present, and detects a line of sight 52 of the user U in the real space 20-4 corresponding to the line of sight of the user U in the space as an example of an instruction direction of the user U. In addition, the data acquisition unit 112 acquires the line of sight 52 of the user U in the real space 20-4 and acquires the position of the real object 40-4 in the real space 20-4 from the depth information detection unit 140.

In this case, the rotation center determination unit 113 determines the center of rotation on the basis of a surface corresponding to depth information regarding the real object 40-4 in the real space 20-4 and the line of sight of the user U in the real space 20-4. FIG. 24 illustrates the line of sight 52 of the user U in the real space 20-4, and illustrates an example in which the rotation center determination unit 113 determines an intersection between the line of sight 52 of the user U in the real space 20-4 and the surface corresponding to the depth information regarding the real object 40-4 as a center of rotation 42-2. In the field of view 53-15, a center of rotation 62-2 is seen as a point corresponding to the center of rotation 42-2 in the real space 20-4.

The rotation control unit 114 rotates the real object 40-4 relatively to a viewpoint position of the user U (the position of the viewpoint camera 51) on the basis of the center of rotation 42-2. According to such a configuration, it is possible to perform the rotation of the real object 40-4 relative to the viewpoint position of the user U in further accordance with a desire of the user U. Note that, in the present specification, it is mainly assumed that the rotation of the real object 40-4 is performed on the basis of a rotating operation of the user U. However, the rotation of the real object 40-4 may be automatically performed without depending on a rotating operation of the user U.

Further, also in the second embodiment of the present disclosure, the real object 40-4 may be rotated relatively to a viewpoint position of the user U. Therefore, the rotation control unit 114 may directly rotate the real object 40-4 with the center of rotation 42-2 as a reference, or may directly rotate the viewpoint position (the position of the viewpoint camera 51). Hereinafter, an example in which the rotation control unit 114 directly rotates the viewpoint position (the position of the viewpoint camera 51) with the center of rotation 42-2 as a reference will be mainly described.

In a case in which the center of rotation 42-2 is determined, the movement control unit 115 may move the real object 60-4 in parallel relatively to the field of view 53-15 (may move the real object 40-4 in parallel relatively to the viewpoint camera 51) so that the center of rotation 62-2 is aligned with a predetermined position of the field of view 53-15 of the user U. Then, it is possible to provide the real object 60-4 which is more easily observed by the user U. Here, the predetermined position is not particularly limited.

For example, the predetermined position aligned with the center of rotation 62-2 may be the center of the field of view 53-15. In addition, since it is assumed that a player who is present at the center of rotation 62-2 moves from time to time, the rotation control unit 114 may track the player who is present at the center of rotation 62-2. In addition, the rotation control unit 114 may cause the player to follow the center of rotation 62-2 on the basis of the tracking. Then, the movement control unit 115 can cause the player who is present at the center of rotation 62-2 to align at a predetermined position (for example, the center of the field of view 53-15) of the field of view 53-15 of the user U at all times.

In the above, a description has been given of an example in which an intersection between a line of sight of a user and a surface corresponding to depth information regarding a real object (as an example of a predetermined surface based on the depth information regarding the real object) is determined as the center of rotation. However, similarly to the first embodiment of the present disclosure, the rotation center determination unit 113 may determine an intersection between an envelope surface of the real object in a real space and a line of sight in a real space as the center of rotation. Alternatively, the rotation center determination unit 113 may calculate a voxel surface obtained by abstracting the surface of the real object in voxel units as an example of a predetermined surface based on the depth information regarding the real object.

Note that the position of a focus of a camera imaging the real space may be appropriately controlled. More specifically, depth information regarding the center of rotation 42-2 is obtained by the depth information detection unit 140. Consequently, the output control unit 111 may control the position of the focus of the camera on the basis of the depth information regarding the center of rotation 42-2. More specifically, the output control unit 111 may control the position of the focus of the camera on the basis of the depth information regarding the center of rotation 42-2, the size of an image captured by the camera, and the size of an image sensor. Then, a field of view in which the periphery of the center of rotation 42-2 is seen more clearly may be provided to the user.

Figure 25:
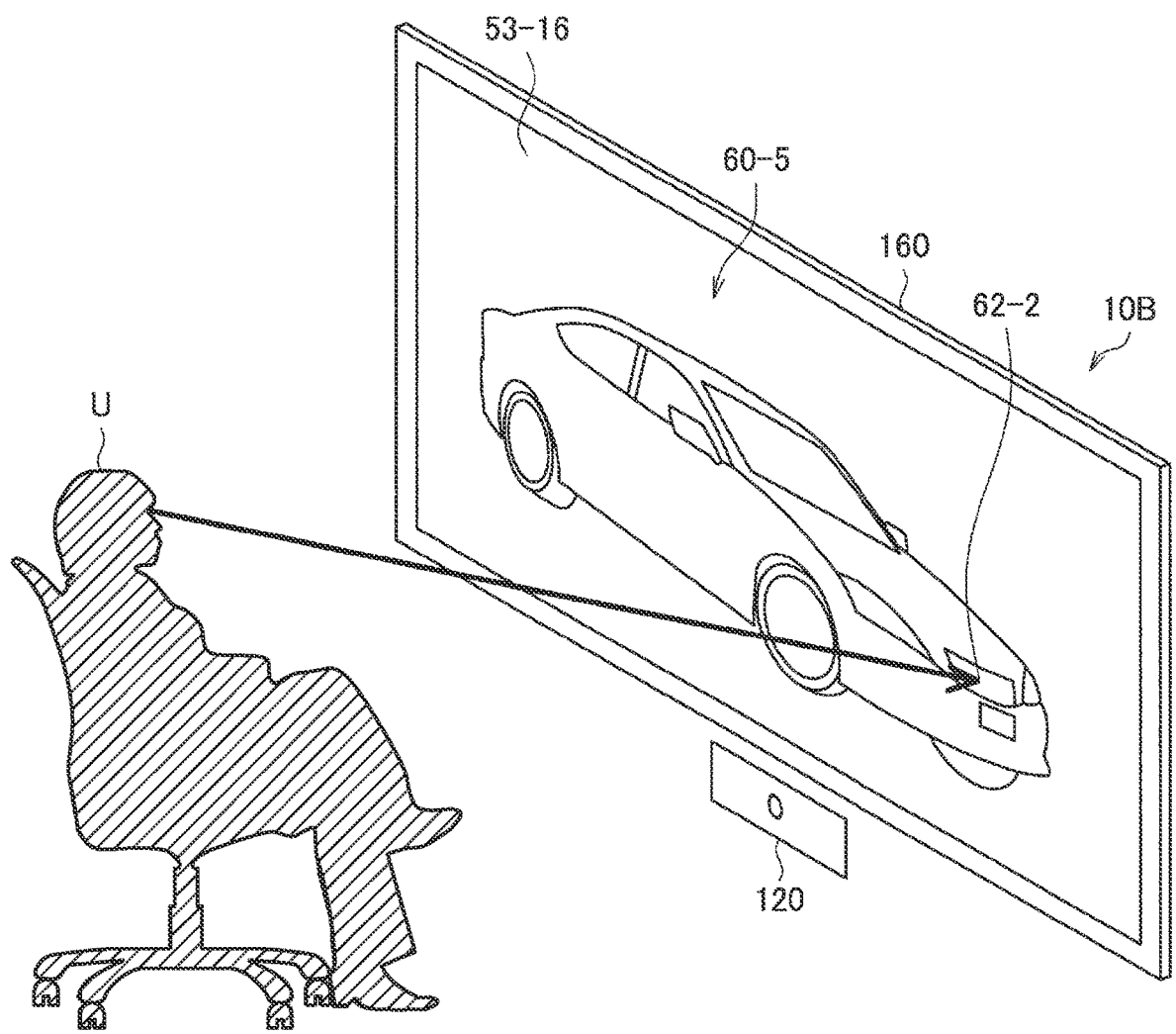
FIG. 25 is a diagram illustrating a second example of the information processing device according to the second embodiment of the present disclosure.
Figure 26:
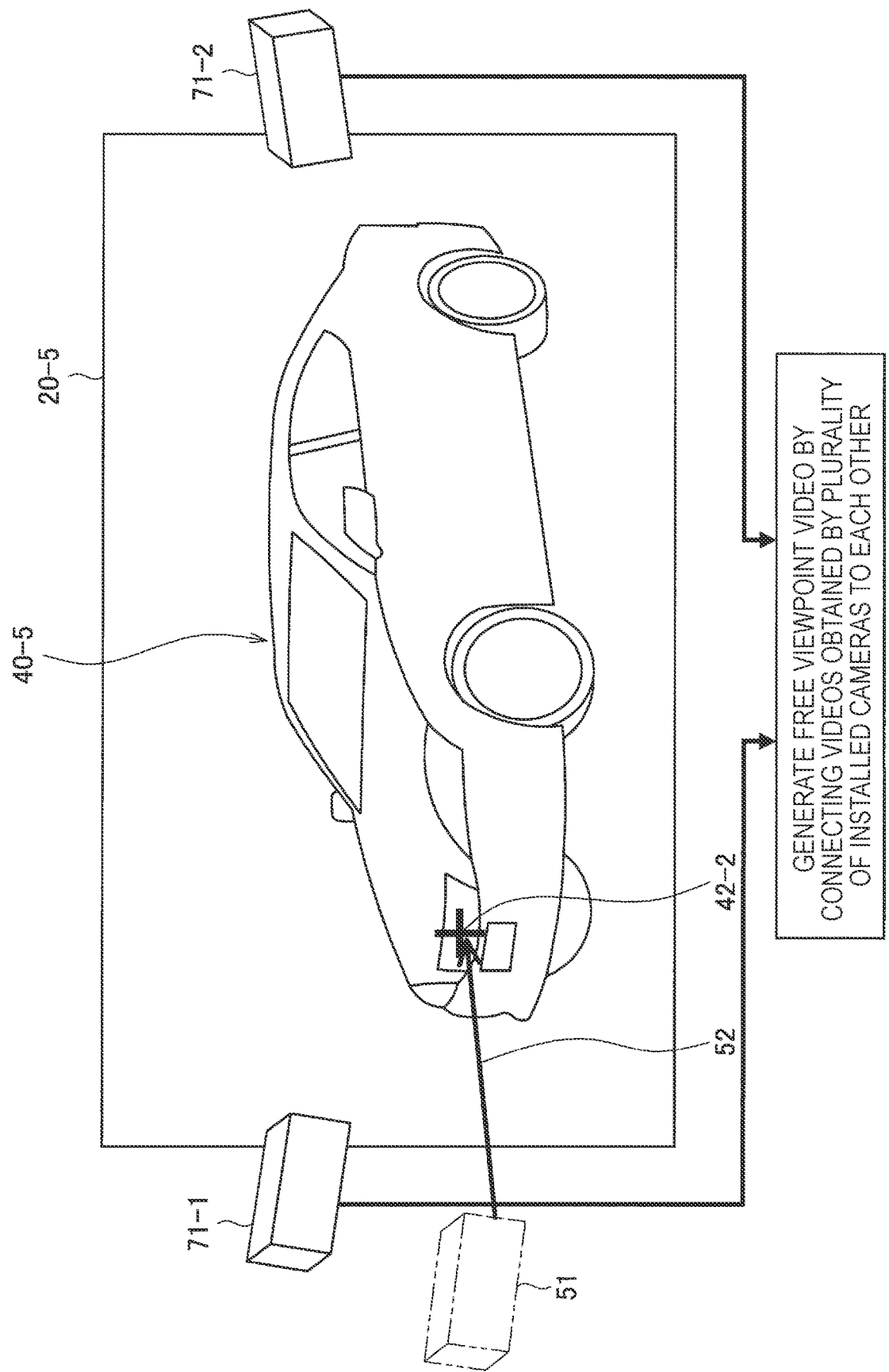
FIG. 26 is a diagram illustrating an example of a real object in a real space in the second example of the information processing device according to the second embodiment of the present disclosure.

FIG. 25 is a diagram illustrating a second example of the information processing device 10B according to the second embodiment of the present disclosure. FIG. 26 is a diagram illustrating an example of a real object in a real space in the second example of the information processing device 10B according to the second embodiment of the present disclosure. As illustrated in FIG. 25, the information processing device 10B is installed in a room where a user U is present, and includes an instruction direction detection unit 120 and an output unit 160.

As illustrated in FIG. 25, also in the second example, a case in which the information processing device 10B is a television device is mainly assumed. Referring to FIG. 26, a real object 40-5 is present in a real space 20-5, and an installed camera 71-1 and an installed camera 71-2 each of which images the real object 40-5 at different positions are present. The number of installed cameras 71 is not particularly limited. In addition, a virtual viewpoint camera 51 is installed at a realistic viewpoint position in the real space 20-5. In addition, videos obtained by imaging the real object 40-5 by each of the installed camera 71-1 and the installed camera 71-2 are connected to each other by an output control unit 1/1, so that a free viewpoint video captured by the virtual viewpoint camera 51 is generated.

The free viewpoint video generated by the output control unit 111 is displayed by the output unit 160, so that a field of view 53-16 is provided to the user U. Referring to FIG. 25, a vehicle is illustrated as an example of a real object 60-5 seen in the field of view 53-16. Note that the real object 60-5 is not limited to the vehicle. Also in the present example, the virtual object 40-5 is relatively rotated similar to the first example of the second embodiment of the present disclosure.

Figure 27:
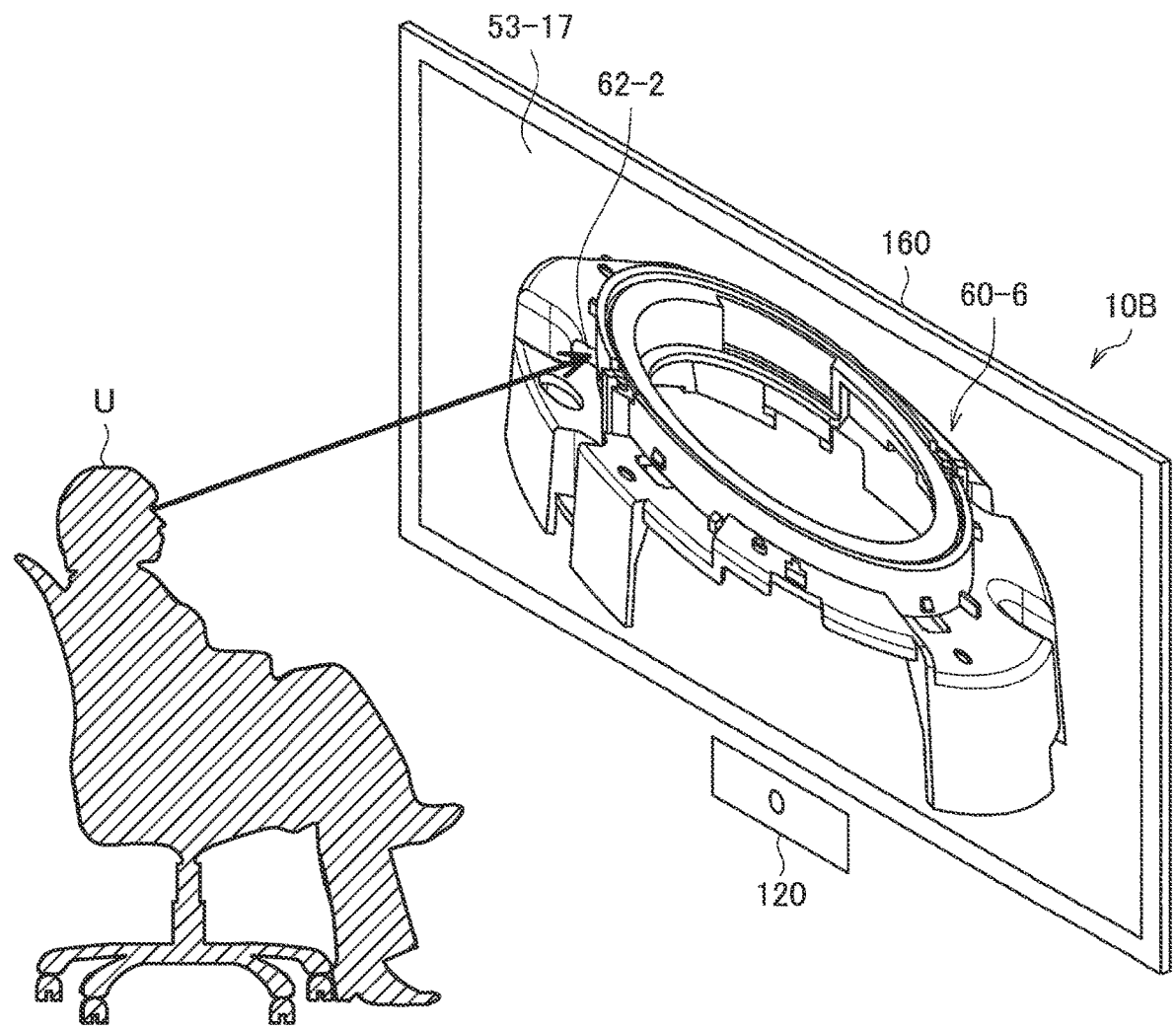
FIG. 27 is a diagram illustrating a third example of the information processing device according to the second embodiment of the present disclosure.
Figure 28:
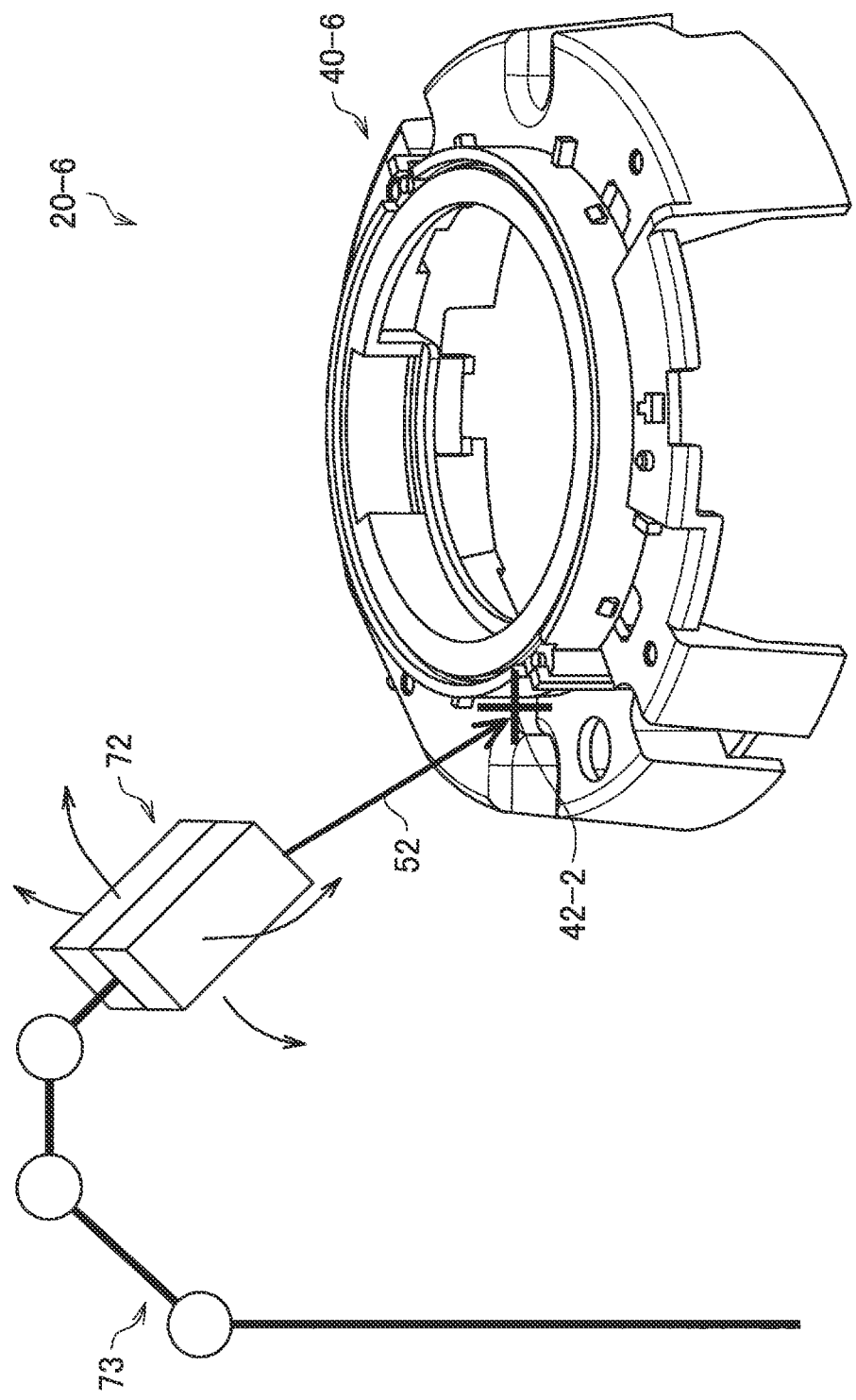
FIG. 28 is a diagram illustrating an example of a real object in a real space in the third example of the information processing device according to the second embodiment of the present disclosure.

FIG. 27 is a diagram illustrating a third example of the information processing device 10B according to the second embodiment of the present disclosure. FIG. 28 is a diagram illustrating an example of a real object in a real space in the third example of the information processing device 10B according to the second embodiment of the present disclosure. As illustrated in FIG. 27, the information processing device 10B is installed in a room where the user U is present, and includes an instruction direction detection unit 120 and an output unit 160.

As illustrated in FIG. 27, also in the third example, a case in which the information processing device 10B is a television device is mainly assumed. Referring to FIG. 28, a real object 40-6 is present in a real space 20-6, and a stereo camera 72 is present at a realistic viewpoint position. In addition, a video obtained by imaging the real object 40-6 by the stereo camera 72 is displayed by the output unit 160, so that a field of view 53-17 is provided to the user U. Referring to FIG. 27, a machine is illustrated as an example of a real object 60-6 seen in the field of view 53-17. Note that the real object 60-6 is not limited to the machine.

In the present example, the instruction direction detection unit 120 detects a line of sight of the user U in a space where the user U is present, and detects a line of sight 52 of the user U in the real space 20-6 corresponding to the line of sight of the user U in the space as an example of an instruction direction of the user U. In addition, the data acquisition unit 112 acquires the line of sight 52 of the user U in the real space 20-6, and acquires the position of the real object 40-6 in the real space 20-6 from the stereo camera 72.

In the present example, the stereo camera 72 is directly rotated by a robot arm 73, so that the real object 40-6 is relatively rotated. Note that the stereo camera 72 is not necessarily rotated by the robot arm 73. For example, the stereo camera 72 may be rotated by a movable robot instead of the robot arm 73.

Figure 29:
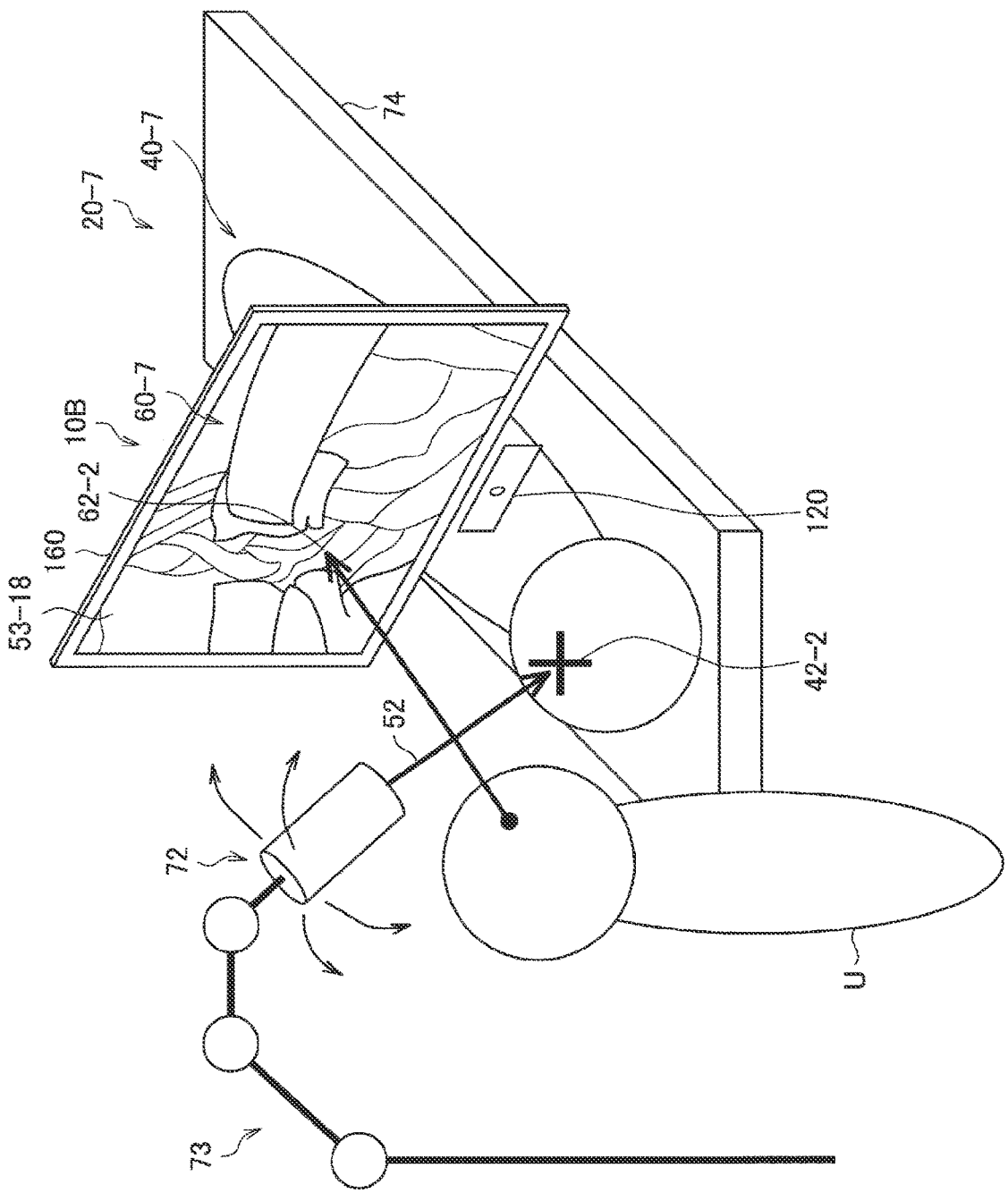
FIG. 29 is a diagram illustrating a fourth example of the information processing device according to the second embodiment of the present disclosure.

FIG. 29 is a diagram illustrating a fourth example of the information processing device 10B according to the second embodiment of the present disclosure. As illustrated in FIG. 29, the information processing device 10B is installed in an operating room where the user U is present, and includes an instruction direction detection unit 120 and an output unit 160. In addition, an operating table 74 is present in the operating room.

As illustrated in FIG. 29, also in the fourth example, a case in which the information processing device 10B is a monitor is mainly assumed. Referring to FIG. 29, a real object 40-7 is present in a real space 20-7, and the stereo camera 72 is present at a realistic viewpoint position. In addition, a video obtained by imaging the real object 40-7 by the stereo camera 72 is displayed by the output unit 160, so that a field of view 53-18 is provided to the user U. Referring to FIG. 29, a person to be operated is illustrated as an example of a real object 60-7 seen in the field of view 53-18.

In the present example, the instruction direction detection unit 120 detects a line of sight of the user U, and detects a line of sight 52 of the user U in the real space 20-7 corresponding to the line of sight of the user U as an example of an instruction direction of the user U. In addition, the data acquisition unit 112 acquires the line of sight 52 of the user U in the real space 20-7 and acquires the position of the real object 40-7 in the real space 20-7 from the stereo camera 72.

In the present example, the stereo camera 72 is directly rotated by the robot arm 73, so that the real object 40-7 is relatively rotated. Note that the stereo camera 72 is not necessarily rotated by the robot arm 73. For example, the stereo camera 72 may be rotated by a movable robot instead of the robot arm 73. Further, in the present example, although an example in which the stereo camera 72 is directly rotated by the robot arm 73 has been described, the real object 40-7 on the operating table 74 may be rotated by the operating table 74 being directly rotated.

Figure 30:
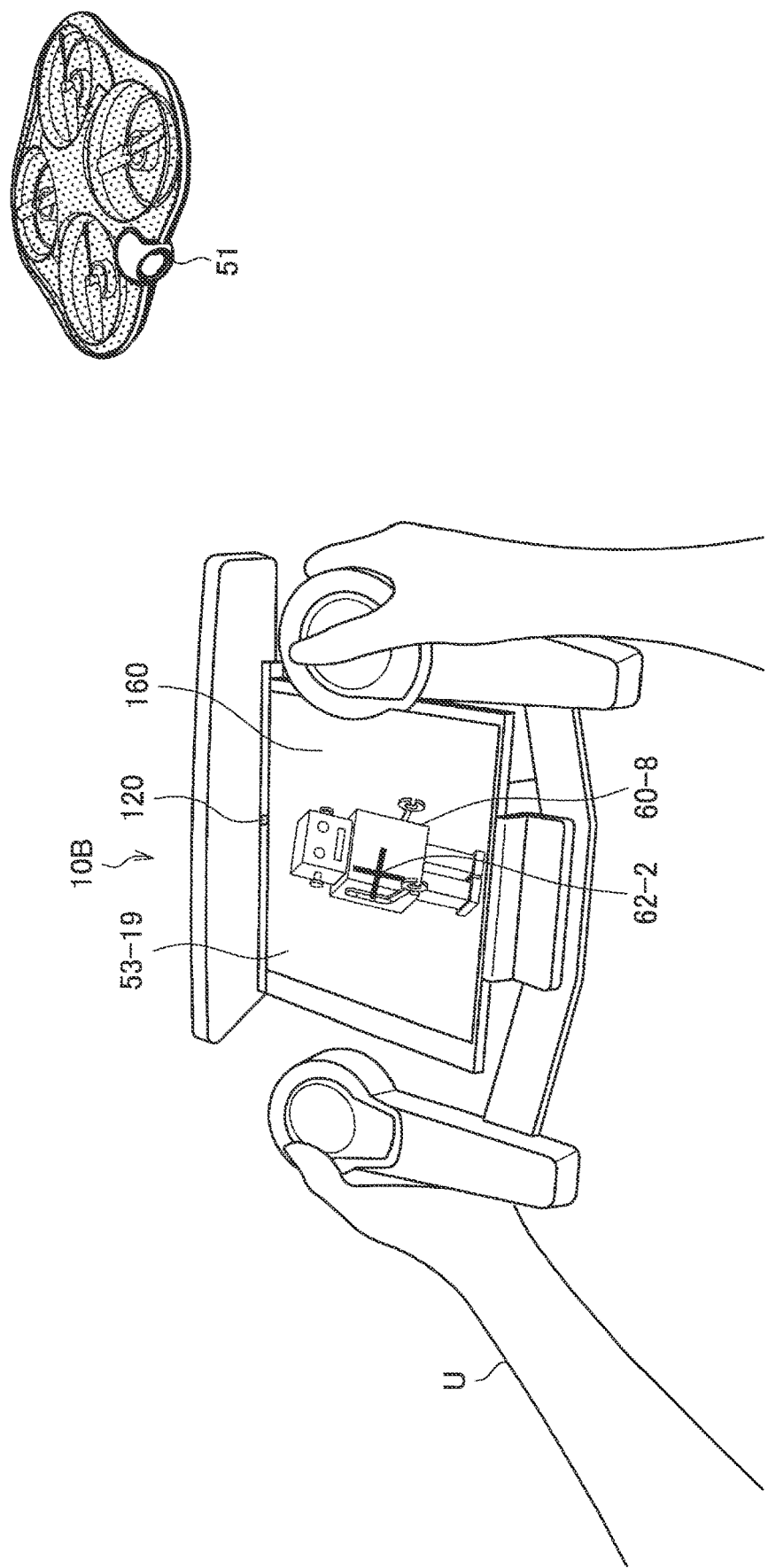
FIG. 30 is a diagram illustrating a fifth example of the information processing device according to the second embodiment of the present disclosure.
Figure 31:
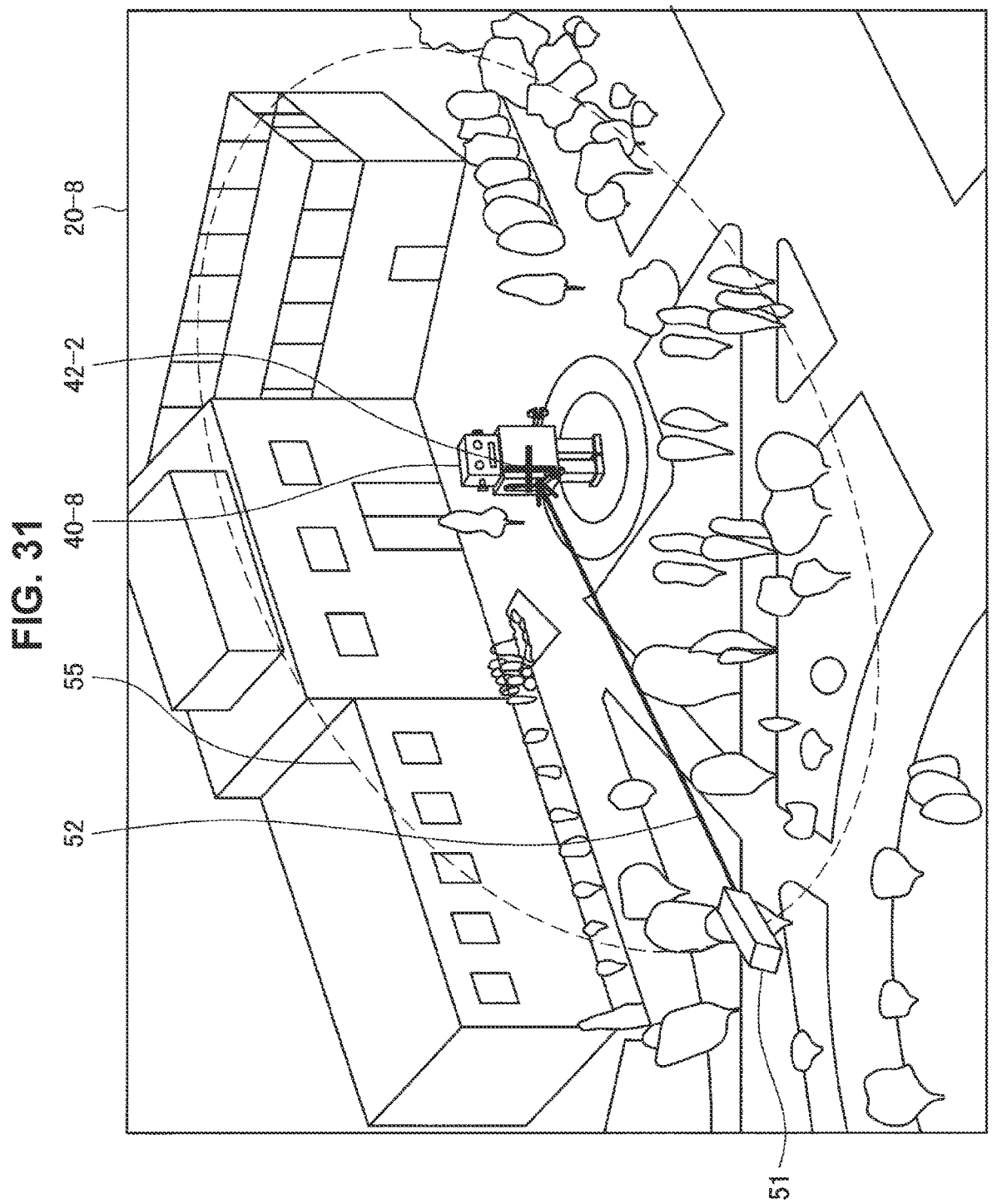
FIG. 31 is a diagram illustrating an example of a real object in a real space in the fifth example of the information processing device according to the second embodiment of the present disclosure.

FIG. 30 is a diagram illustrating a fifth example of the information processing device 10B according to the second embodiment of the present disclosure. FIG. 31 is a diagram illustrating an example of a real object in a real space in the fifth example of the information processing device 10B according to the second embodiment of the present disclosure. As illustrated in FIG. 30, the information processing device 10B is a controller to which a user U can input a rotating operation, a moving operation, and the like and includes an instruction direction detection unit 120 and an output unit 160.

Referring to FIG. 31, a real object 40-8 is present in a real space 20-8, and a viewpoint camera 51 is present at a realistic viewpoint position. In the example illustrated in FIGS. 30 and 31, the viewpoint camera 51 is mounted on a drone. In addition, a video obtained by imaging the real object 40-8 by the viewpoint camera 51 is displayed by the output unit 160, so that a field of view 53-19 is provided to the user U. Referring to FIG. 30, a robot is illustrated as an example of a real object 60-8 seen in the field of view 53-19. Note that the real object 60-8 is not limited to the robot.

In the present example, the instruction direction detection unit 120 detects a line of sight of the user U in the real space where the user U is present, and detects a line of sight 52 of the user U in the real space 20-8 corresponding to the line of sight of the user U in the space as an example of an instruction direction of the user U. In addition, the data acquisition unit 112 acquires the line of sight 52 of the user U in the real space 20-8 and acquires the position of the real object 40-8 in the real space 20-8 from the viewpoint camera 51 (for example, a depth camera).

In the present example, a drone having the viewpoint camera 51 mounted thereon is directly rotated, so that the real object 40-8 is relatively rotated. FIG. 31 illustrates a track 55 of the drone having the viewpoint camera 51 mounted thereon. Note that, in FIG. 30, a case in which the information processing device 10B is a controller operated by the user U has been described. However, the information processing device 10B is not limited to the controller operated by the user U, and may be a wearable device. In addition, the wearable device may include an instruction direction detection unit 120 and an output unit 160.

Figure 32:
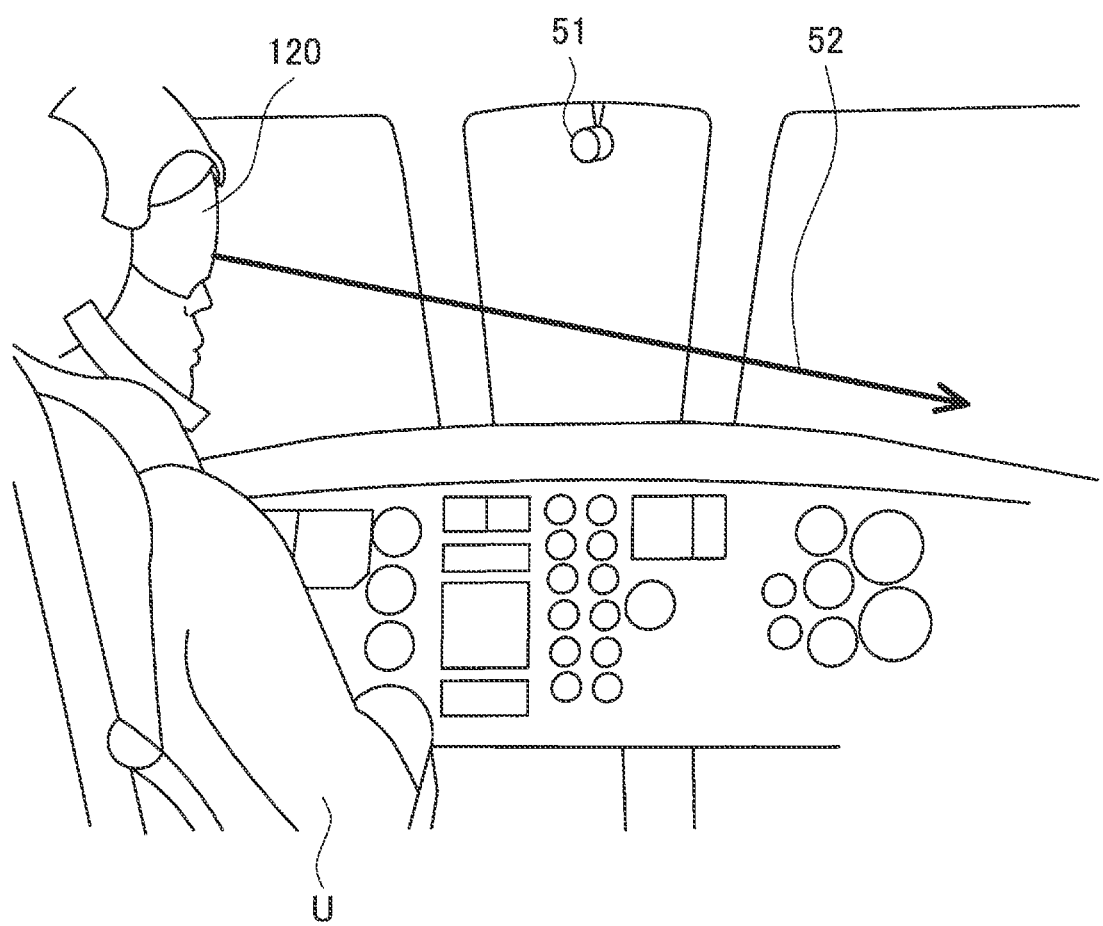
FIG. 32 is a diagram illustrating a sixth example of the information processing device according to the second embodiment of the present disclosure.
Figure 33:
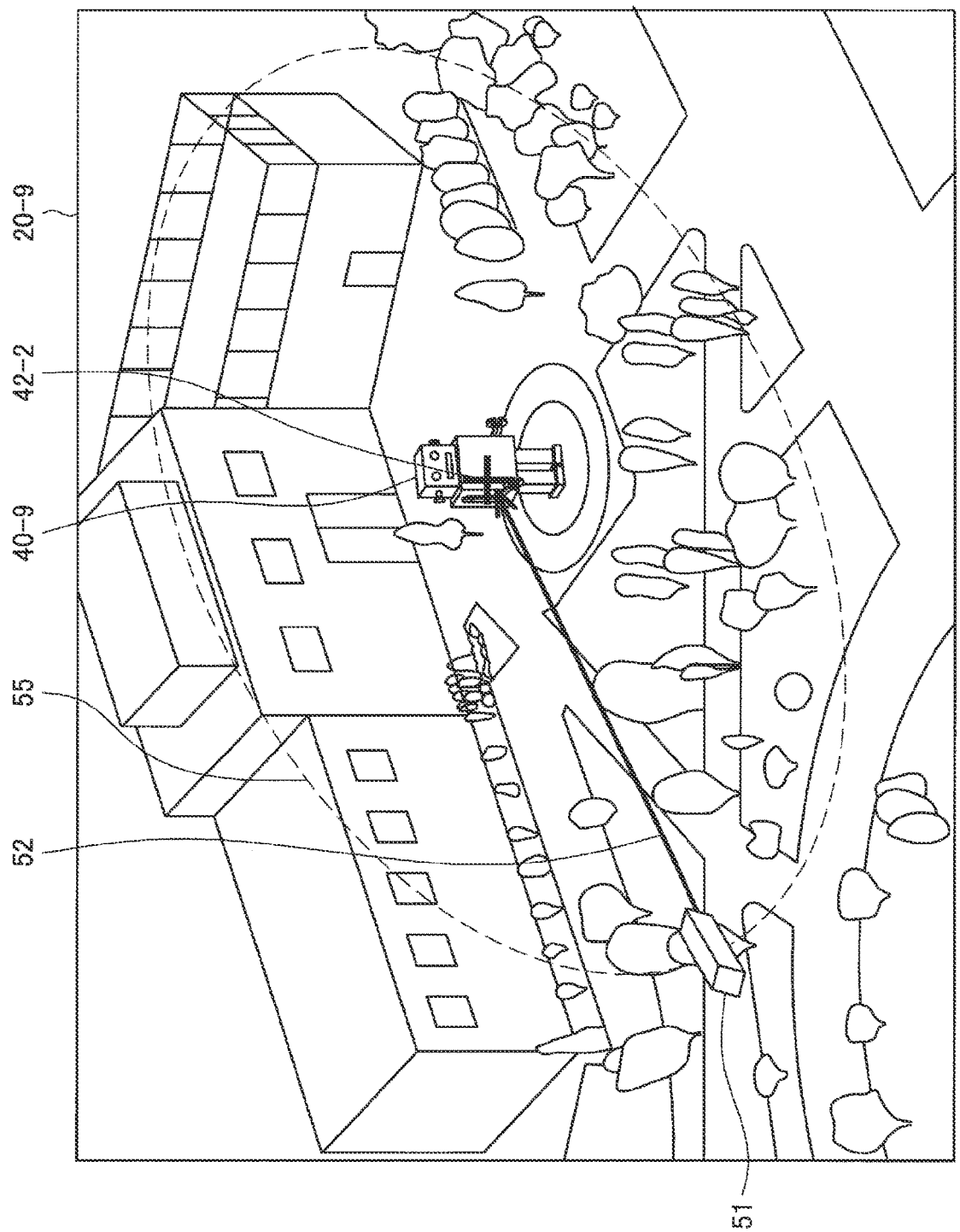
FIG. 33 is a diagram illustrating an example of a real object in a real space in the sixth example of the information processing device according to the second embodiment of the present disclosure.

FIG. 32 is a diagram illustrating a sixth example of the information processing device 10B according to the second embodiment of the present disclosure. FIG. 33 is a diagram illustrating an example of a real object in a real space in the sixth example of the information processing device 10B according to the second embodiment of the present disclosure. As illustrated in FIG. 30, the information processing device 10B is worn on the head of the user U on a helicopter, and includes the instruction direction detection unit 120. Note that the information processing device 10B may not particularly include the output unit 160.

Referring to FIG. 33, a real object 40-9 is present in a real space 20-9, and a viewpoint camera 51 is present at a realistic viewpoint position. In the example illustrated in FIGS. 32 and 33, the viewpoint camera 51 is mounted on a helicopter. In the present example, a field of view of the user U is formed by a landscape that the user U directly looks down from the helicopter. Referring to FIG. 33, a robot is illustrated as an example of the real object 40-9 seen in the field of view. Note that the real object 40-9 is not limited to the robot.

In the present example, the instruction direction detection unit 120 detects a line of sight 52 of the user U in the real space 20-9 as an example of an instruction direction of the user U, on the basis of the line of sight of the user U and the direction of the instruction direction detection unit 120. In addition, the data acquisition unit 112 acquires the line of sight 52 of the user U in the real space 20-9 and acquires the position of the real object 40-9 in the real space 20-9 from the viewpoint camera 51 (for example, a depth camera).

In the present example, a helicopter having the viewpoint camera 51 mounted thereon is directly rotated, so that the real object 40-9 is relatively rotated. FIG. 33 illustrates a track 55 of the helicopter having the viewpoint camera 51 mounted thereon. Note that, in FIG. 32, a case in which the information processing device 10B is worn on the head of the user U has been described. However, the information processing device 10B may be a stationary device. In addition, the stationary device may include the instruction direction detection unit 120.

Figure 34:
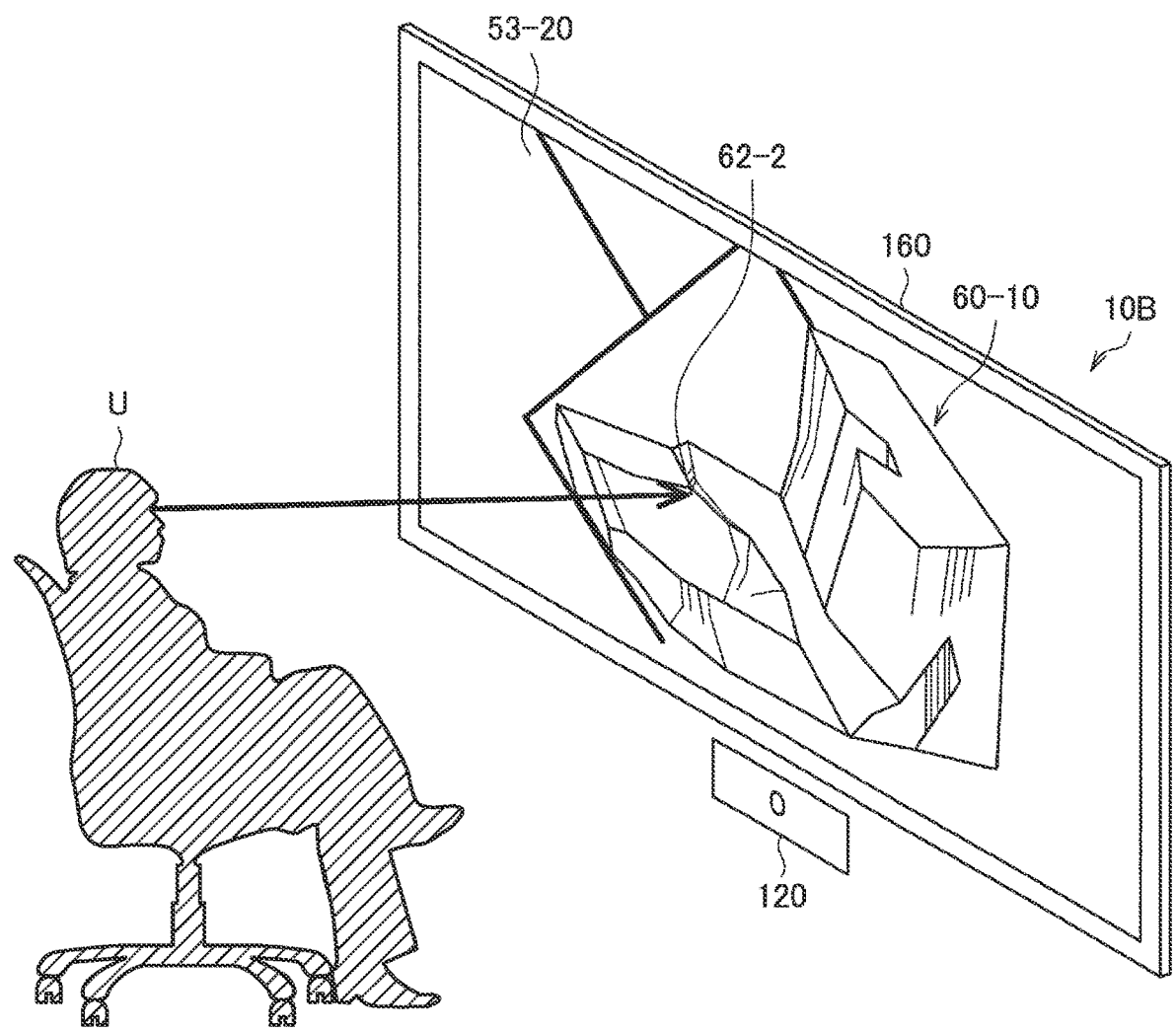
FIG. 34 is a diagram illustrating a seventh example of the information processing device according to the second embodiment of the present disclosure.
Figure 35:
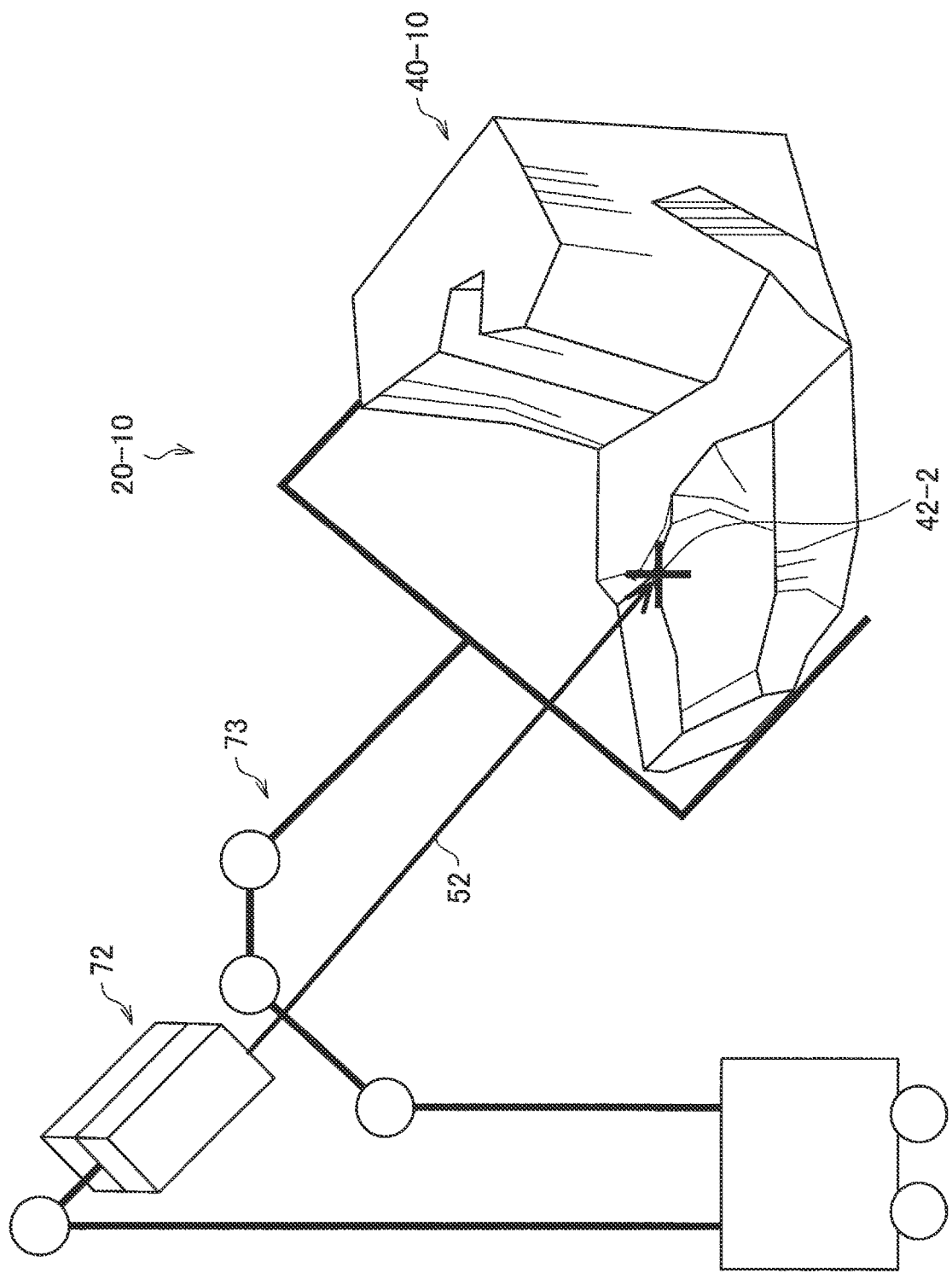
FIG. 35 is a diagram illustrating an example of a real object in a real space in the seventh example of the information processing device according to the second embodiment of the present disclosure.

FIG. 34 is a diagram illustrating a seventh example of the information processing device 10B according to the second embodiment of the present disclosure. FIG. 35 is a diagram illustrating an example of a real object in a real space in the seventh example of the information processing device 10B according to the second embodiment of the present disclosure. As illustrated in FIG. 34, the information processing device 10B is installed in a room where a user U is present, and includes an instruction direction detection unit 120 and an output unit 160.

As illustrated in FIG. 34, also in the seventh example, a case in which the information processing device 10B is a television device is mainly assumed. Referring to FIG. 35, a real object 40-10 is present in a real space 20-10, and a stereo camera 72 is present at a realistic viewpoint position. In addition, a video obtained by imaging the real object 40-10 by the stereo camera 72 is displayed by the output unit 160, so that a field of view 53-20 is provided to the user U. Referring to FIG. 34, rubble is illustrated as an example of a real object 60-10 seen in the field of view 53-20. Note that the real object 60-10 is not limited to the rubble.

In the present example, the instruction direction detection unit 120 detects a line of sight of the user U in a space where the user U is present, and detects a line of sight 52 of the user U in the real space 20-10 corresponding to the line of sight of the user U in the space as an example of an instruction direction of the user U. In addition, the data acquisition unit 112 acquires the line of sight 52 of the user U in the real space 20-10, and acquires the position of the real object 40-10 in the real space 20-10 from the stereo camera 72.

In the present example, the real object 40-10 is directly rotated by a robot arm 73. Note that the real object 40-10 is not necessarily rotated by the robot arm 73. For example, the real object 40-10 may be rotated by a movable robot instead of the robot arm 73.

3. HARDWARE CONFIGURATION EXAMPLE

Figure 36:
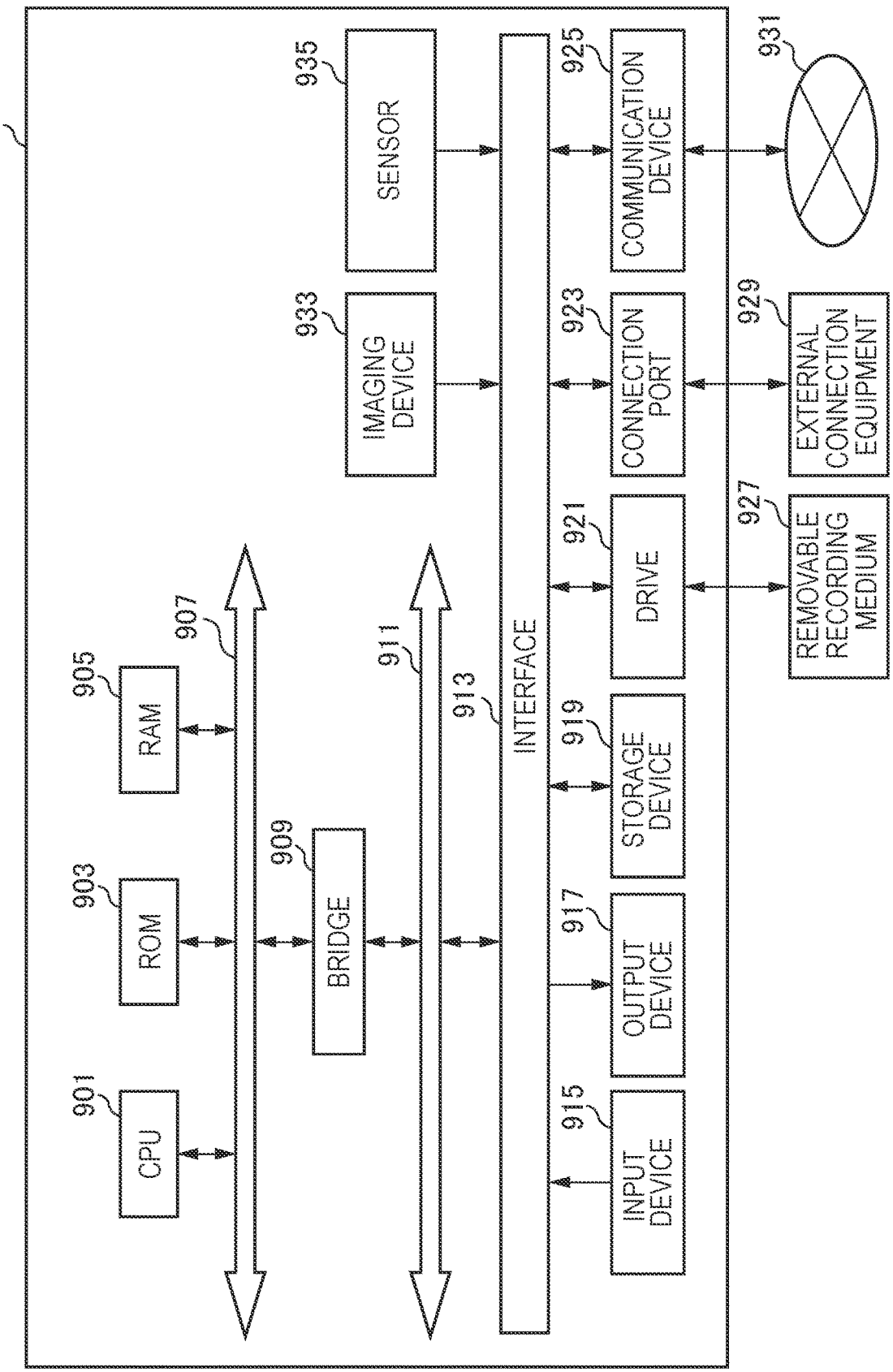
FIG. 36 is a block diagram illustrating a hardware configuration example of an information processing device.

Next, with reference to FIG. 36, a hardware configuration of the information processing device 10 according to the embodiment of the present disclosure will be described. FIG. 36 is a block diagram illustrating the hardware configuration example of the information processing device 10 according to the embodiment of the present disclosure.

As illustrated in FIG. 36, the information processing device 10 includes a central processing unit (CPU) 901, read only memory (ROM) 903, and random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. Moreover, the information processing device 10 may include an imaging device 933 and a sensor 935, as necessary. The information processing device 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the information processing device 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing device 10. The input device 915 includes an input control circuit that generates input signals on the basis of information which is input by a user to output the generated input signals to the CPU 901. A user inputs various types of data and indicates a processing operation to the information processing device 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), a plasma display panel (PDP), an organic electro-luminescence (EL) display, a projector, or a hologram display device, a sound output device such as a speaker or a headphone, or a printer. The output device 917 outputs a result obtained through a process performed by the information processing device 10, in the form of text or video such as an image, or sounds such as voice and audio sounds. In addition, the output device 917 may include a light or the like to light the surroundings.

The storage device 919 is a device for data storage that is an example of the storage unit of the information processing device 10. The storage device 919 includes, for example, a magnetic storage unit device such as a hard disk drive (HDD), a semiconductor storage device, an optical storage device, or a magneto-optical storage device. The storage device 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the information processing device 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the information processing device 10 and the external connection equipment 929.

The communication device 925 is a communication interface including, for example, a communication device for connection to the communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio communication, or satellite communication.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, a vibration sensor, an optical sensor, and a sound sensor. The sensor 935 acquires information regarding a state of the information processing device 10 such as a posture of a housing of the information processing device 10, and information regarding an environment surrounding the information processing device 10 such as luminous intensity and noise around the information processing device 10. The sensor 935 may include a global positioning system (GPS) sensor that receives GPS signals to measure latitude, longitude, and altitude of the device.

4. CONCLUSION

As described above, according to the embodiments of the present disclosure, there is provided an information processing device 10 including a rotation center determination unit that determines the center of rotation based on the position of an object in a three-dimensional space and an instruction direction of a user in a three-dimensional space, and a rotation control unit that rotates the object relatively to the viewpoint position of the user on the basis of the center of rotation. According to such a configuration, it is possible to rotate an object relatively to the viewpoint position of the user in further accordance with the user's desire.

The preferred embodiment (s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, when the operation of the above-described information processing device 10 is realized, the position of each component is not particularly limited. As a specific example, some or all of the blocks (the output control unit 111, the data acquisition unit 112, the rotation center determination unit 113, the rotation control unit 114, and the movement control unit 115) which are included in the control unit 110 may be present in a server or the like.

For example, when the output control unit 111 is present in a server, the control of output by the output control unit 111 may include transmission of output information from the server to a client. For example, when the rotation control unit 114 is present in a server, control of rotation by the rotation control unit 114 may include transmission of rotation information from the server to a client. Further, when the movement control unit 115 is present in a server, control of movement by the movement control unit 115 may include transmission of movement information from the server to a client. In this manner, the information processing device 10 may be achieved by so-called cloud computing.

In addition, it is also possible to create a computer program for causing hardware such as CPU, ROM, and RAM, which are embedded in a computer, to execute functions equivalent to the functions of the control unit 110. Moreover, it may be possible to provide a computer-readable recording medium having the program recorded thereon.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a rotation center determination unit that determines a center of rotation based on a position of an object in a three-dimensional space and an instruction direction of a user in the three-dimensional space; and a rotation control unit that rotates the object relative to a viewpoint position of the user on the basis of the center of rotation.

(2)

The information processing device according to (1), in which the rotation control unit rotates the object or the viewpoint position with the center of rotation as a reference.

(3)

The information processing device according to (2), in which the rotation control unit rotates the viewpoint position with the center of rotation as a reference, and controls a rotation track of the viewpoint position on the basis of a positional relationship between the center of rotation and the viewpoint position.

(4)

The information processing device according to any one of (1) to (3), in which the information processing device includes a movement control unit that rotates the object relative to a field of view of the user so that the center of rotation aligns with a predetermined position of the field of view, in a case in which the center of rotation is determined.

(5)

The information processing device according to any one of (1) to (4), in which the rotation control unit rotates the object relative to the viewpoint position of the user in accordance with a rotation speed based on a parameter related to the object.

(6)

The information processing device according to (5), in which the parameter includes at least one of complexity of a shape of the object, a size of the object, or a distance between the viewpoint position and the object.

(7)

The information processing device according to any one of (1) to (6), in which the instruction direction includes at least one of a line of sight of the user, a result of detection performed by a motion sensor, a result of detection performed by a tactile type device, a direction indicated by a predetermined object, a direction indicated by a finger of the user, a result of recognition of the user's face, a result of recognition of a marker, or a result of recognition of a sound.

(8)

The information processing device according to any one of (1) to (7), in which the rotation center determination unit brings the center of rotation close to the viewpoint position in a case in which the center of rotation is positioned farther from the viewpoint position than a predetermined distance.

(9)

The information processing device according to any one of (1) to (8), in which the rotation center determination unit calculates depth information regarding the object in the three-dimensional space on the basis of a convergence angle of the user, and determines the center of rotation on the basis of the depth information and the instruction direction.

(10)

The information processing device according to any one of (1) to (9), in which the information processing device includes an output control unit that controls output of information indicating a rotatable range of the object relative to the viewpoint position.

(11)

The information processing device according to any one of (1) to (9), in which the information processing device includes an output control unit that controls output of information indicating that rotation of the object relative to the viewpoint position has reached a limit of a rotatable range, in a case in which the relative rotation has reached the limit of the rotatable range.

(12)

The information processing device according to any one of (1) to (9), in which the information processing device includes an output control unit that controls display of an image of the object obtained by a camera which is realistically or virtually present at the viewpoint position.

(13)

The information processing device according to (12), in which the output control unit controls a position of a focus of the camera on the basis of depth information regarding the center of rotation.

(14)

The information processing device according to any one of (1) to (9), in which the information processing device includes an output control unit that controls output of information indicating that the instruction direction is not detected, in a case in which the instruction direction is not detected.

(15)

The information processing device according to any one of (1) to (14), in which the three-dimensional space is a virtual space, the object is a virtual object, and the viewpoint position is a virtual viewpoint position in the virtual space.

(16)

The information processing device according to (15), in which the rotation center determination unit determines an intersection between a predetermined surface based on a position of the virtual object in the virtual space and the instruction direction in the virtual space as the center of rotation.

(17)

The information processing device according to any one of (1) to (14), in which the three-dimensional space is a real space, the object is a real object, and the viewpoint position is a realistic viewpoint position in the real space.

(18)

The information processing device according to (17), in which the rotation center determination unit determines an intersection between a predetermined surface based on depth information regarding the real object in the real space and the instruction direction in the real space as the center of rotation.

(19)

An information processing method including:

determining a center of rotation based on a position of an object in a three-dimensional space and an instruction direction of a user in the three-dimensional space; and rotating the object relative to a viewpoint position of the user by a processor on the basis of the center of rotation.

(20)

A program causing a computer to function as an information processing device including a rotation center determination unit that determines a center of rotation based on a position of an object in a three-dimensional space and an instruction direction of a user in the three-dimensional space, and a rotation control unit that rotates the object relative to a viewpoint position of the user on the basis of the center of rotation.

REFERENCE SIGNS LIST 10 (10A, 10B) information processing device
20 space (real space, virtual space)
40 object (real object, virtual object)
42 center of rotation
51 viewpoint camera
52 line of sight
53 field of view
54 envelope surface
55 track
56 non-detection information
57 rotatable range
58 mark
59 limit reach information
60 object (real object, virtual object)
61 observation-desired region
62 center of rotation
71 installed camera
72 stereo camera
73 robot arm
74 operating table
110 control unit
111 output control unit
112 data acquisition unit
113 rotation center determination unit
114 rotation control unit
115 movement control unit
120 instruction direction detection unit
130 operation detection unit
140 information detection unit
150 (150A, 150B) storage unit
151 3D model information
160 output unit

The invention claimed is:

1. An information processing device comprising:
   circuitry configured to
      determine a center of rotation based on a position of an object in a three-dimensional space and an instruction direction of a user in the three-dimensional space, and
      rotate the object relative to a viewpoint position of the user on a basis of the center of rotation,
   wherein the rotation of the object is performed relative to the viewpoint position of the user in accordance with a rotation speed of the object that is determined based on a parameter related to the object, and
   wherein the parameter used to determine the rotation speed of the object includes complexity of a shape of the object.

2. The information processing device according to claim 1,
   wherein the circuitry rotates the object or the viewpoint position with the center of rotation as a reference.

3. The information processing device according to claim 2,
   wherein the circuitry rotates the viewpoint position with the center of rotation as the reference, and controls a rotation track of the viewpoint position on a basis of a positional relationship between the center of rotation and the viewpoint position.

4. The information processing device according to claim 1, wherein the circuitry is further configured to
   rotate the object relative to a field of view of the user so that the center of rotation aligns with a predetermined position of the field of view, in a case in which the center of rotation is determined.

5. The information processing device according to claim 1,
   wherein the parameter further includes a distance between the viewpoint position and the object.

6. The information processing device according to claim 1,
   wherein the instruction direction includes at least one of a line of sight of the user, a result of detection performed by a motion sensor, a result of detection performed by a tactile type device, a direction indicated by a predetermined object, a direction indicated by a finger of the user, a result of recognition of the user's face, a result of recognition of a marker, or a result of recognition of a sound.

7. The information processing device according to claim 1,
   wherein the circuitry brings the center of rotation close to the viewpoint position in a case in which the center of rotation is positioned farther from the viewpoint position than a predetermined distance.

8. The information processing device according to claim 1,
   wherein the circuitry calculates depth information regarding the object in the three-dimensional space on a basis of a convergence angle of the user, and determines the center of rotation on a basis of the depth information and the instruction direction.

9. The information processing device according to claim 1, wherein the circuitry is further configured to
   control output of information indicating a rotatable range of the object relative to the viewpoint position.

10. The information processing device according to claim 1, wherein the circuitry is further configured to
control output of information indicating that rotation of the object relative to the viewpoint position has reached a limit of a rotatable range, in a case in which the relative rotation has reached the limit of the rotatable range.

11. The information processing device according to claim 1, wherein the circuitry is further configured to
control display of an image of the object obtained by a camera which is realistically or virtually present at the viewpoint position.

12. The information processing device according to claim 11,
wherein the circuitry controls a position of a focus of the camera on a basis of depth information regarding the center of rotation.

13. The information processing device according to claim 1, wherein the circuitry is further configured to
control output of information indicating that the instruction direction is not detected, in a case in which the instruction direction is not detected.

14. The information processing device according to claim 1,
wherein the three-dimensional space is a virtual space, the object is a virtual object, and
the viewpoint position is a virtual viewpoint position in the virtual space.

15. The information processing device according to claim 14,
wherein the circuitry determines an intersection between a predetermined surface based on a position of the virtual object in the virtual space and the instruction direction in the virtual space as the center of rotation.

16. The information processing device according to claim 1,
wherein the three-dimensional space is a real space, the object is a real object, and the viewpoint position is a realistic viewpoint position in the real space.

17. The information processing device according to claim 16,
wherein the circuitry determines an intersection between a predetermined surface based on depth information regarding the real object in the real space and the instruction direction in the real space as the center of rotation.

18. The information processing device according to claim 1,
wherein the rotation of the object is further performed with respect to a reference angle.

19. The information processing device according to claim 1,
wherein the complexity of the shape of the object is calculated using a dispersion value of depth at each position on a surface of the object.

20. An information processing method comprising:
determining a center of rotation based on a position of an object in a three-dimensional space and an instruction direction of a user in the three-dimensional space; and
rotating the object relative to a viewpoint position of the user by a processor on a basis of the center of rotation,
wherein the rotation of the object is performed relative to the viewpoint position of the user in accordance with a rotation speed of the object that is determined based on a parameter related to the object, and
wherein the parameter used to determine the rotation speed of the object includes complexity of a shape of the object.

21. A non-transitory computer-readable medium having embodied thereon a program, which when executed by a computer causes the computer to execute a method, the method comprising:
determining a center of rotation based on a position of an object in a three-dimensional space and an instruction direction of a user in the three-dimensional space, and
rotating the object relative to a viewpoint position of the user on a basis of the center of rotation,
wherein the rotation of the object is performed relative to the viewpoint position of the user in accordance with a rotation speed of the object that is determined based on a parameter related to the object, and
wherein the parameter used to determine the rotation speed of the object includes complexity of a shape of the object.

* * * * *